United States Patent
Su et al.

(10) Patent No.: US 12,483,643 B2
(45) Date of Patent: Nov. 25, 2025

(54) ROTATING MECHANISM AND FOLDABLE ELECTRONIC DEVICE

(71) Applicant: Honor Device Co., Ltd., Shenzhen (CN)

(72) Inventors: Shuai Su, Shenzhen (CN); Ruihao Chen, Shenzhen (CN); Changfu Dong, Shenzhen (CN); Shaohong Dong, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/269,702

(22) PCT Filed: Dec. 27, 2022

(86) PCT No.: PCT/CN2022/142463
§ 371 (c)(1),
(2) Date: Jun. 26, 2023

(87) PCT Pub. No.: WO2023/179143
PCT Pub. Date: Sep. 28, 2023

(65) Prior Publication Data
US 2025/0080631 A1   Mar. 6, 2025

(30) Foreign Application Priority Data
Mar. 23, 2022 (CN) .......................... 202210288318.9

(51) Int. Cl.
*H04M 1/02* (2006.01)
(52) U.S. Cl.
CPC ......... *H04M 1/022* (2013.01); *H04M 1/0237* (2013.01); *H04M 1/0268* (2013.01)

(58) Field of Classification Search
CPC ................ G06F 1/1652; G06F 1/1681; H04M 1/0214–0222
See application file for complete search history.

(56) References Cited

U.S. PATENT DOCUMENTS

| | | |
|---|---|---|
| 2019/0112852 A1 | 4/2019 | Hsu et al. |
| 2021/0181808 A1 | 6/2021 | Liao et al. |

(Continued)

FOREIGN PATENT DOCUMENTS

| | | | |
|---|---|---|---|
| CN | 104675844 A | * | 6/2015 |
| CN | 107542751 A | * | 1/2018 |

(Continued)

*Primary Examiner* — Patrick F Marinelli
(74) *Attorney, Agent, or Firm* — Slater Matsil, LLP

(57) ABSTRACT

A rotating mechanism and a foldable electronic device are provided. The rotating mechanism includes a fastening base and a synchronous component-which includes a first synchronous swing arm, a second synchronous swing arm, a first rotating rod, a second rotating rod, and a slider. The first and the second rotating rods are mounted side by side and in parallel to the fastening base, both of them can rotate relative to the fastening base, and the slider is located between the first rotating rod and the second rotating rod and slidably connected to the first rotating rod and the second rotating rod. The first synchronous swing arm and the second synchronous swing arm are respectively located on opposite sides of the fastening base, and the first synchronous swing arm is fixedly connected to the first rotating rod, and the second synchronous swing arm is fixedly connected to the second rotating rod.

20 Claims, 18 Drawing Sheets

(56) References Cited

U.S. PATENT DOCUMENTS

| | | |
|---|---|---|
| 2023/0075646 A1 | 3/2023 | Niu et al. |
| 2023/0136116 A1* | 5/2023 | Kim .................. F16C 11/10 361/807 |
| 2024/0160253 A1 | 5/2024 | Liao et al. |
| 2025/0080631 A1* | 3/2025 | Su .................. G06F 1/1652 |

FOREIGN PATENT DOCUMENTS

| | | | | |
|---|---|---|---|---|
| CN | 109780048 A | | 5/2019 | |
| CN | 109882497 A | | 6/2019 | |
| CN | 111614806 A | | 9/2020 | |
| CN | 112995368 A | | 6/2021 | |
| CN | 113067924 A | | 7/2021 | |
| CN | 113194183 A | * | 7/2021 | .......... H04M 1/0268 |
| CN | 114006961 A | | 2/2022 | |
| CN | 114076143 A | | 2/2022 | |
| WO | 2021259340 A1 | | 12/2021 | |

* cited by examiner

ROTATING MECHANISM AND FOLDABLE ELECTRONIC DEVICE

CROSS-REFERENCE TO RELATED APPLICATIONS

This application is a national stage of International Application No. PCT/CN2022/142463, filed on Dec. 27, 2022, which claims priority to Chinese Patent Application No. 202210288318.9, filed on Mar. 23, 2022. The disclosures of both of the aforementioned applications are hereby incorporated by reference in their entireties.

TECHNICAL FIELD

The present application relates to the technical field of electronic products, and in particular, to a rotating mechanism and a foldable electronic device.

BACKGROUND

With the development of science and technologies, appearances (ID) of electronic devices (such as mobile phones and tablet computers) tend to develop from a straight form to a foldable form. A foldable device has a large screen in an unfolded state, which fully satisfies the visual experience of consumers, and is small in size and easy to carry in a folded state. However, most synchronous components of rotating mechanisms in the prior art perform synchronous movement through synchronous gears. However, the synchronous gears have complex structures, which increases thicknesses of the rotating mechanisms, and is not conducive to simplifying of structures and thinning of foldable electronic devices.

SUMMARY

The present application provides a rotating mechanism and a foldable electronic device to solve the technical problem that a structure of a synchronous component of a rotating mechanism is complex in the prior art, which is not conducive to thinning of a foldable electronic device.

According to a first aspect, the present application provides a rotating mechanism, including: a fastening base and a synchronous component; where the synchronous component includes a first synchronous swing arm, a second synchronous swing arm, a first rotating rod, a second rotating rod, and a slider. The first rotating rod and the second rotating rod are mounted side by side and in parallel to the fastening base, both the first rotating rod and the second rotating rod can rotate relative to the fastening base, and the slider is located between the first rotating rod and the second rotating rod and is slidably connected to the first rotating rod and the second rotating rod.

The first synchronous swing arm and the second synchronous swing arm are respectively located on opposite sides of the fastening base, and the first synchronous swing arm is fixedly connected to the first rotating rod, and the second synchronous swing arm is fixedly connected to the second rotating rod. The rotation of the first rotating rod can push the slider to slide, to push the second rotating rod to rotate through the sliding of the slider, a sliding direction of the slider is parallel to directions of axis centers of the first rotating rod and the second rotating rod, and the rotation directions of the first rotating rod and the second rotating rod are opposite.

The rotating mechanism is applied to a foldable electronic device, and the foldable electronic device includes a first casing, a second casing, and a display screen. The first casing is connected to the first synchronous swing arm, and the second casing is connected to the second synchronous swing arm. The rotating mechanism is located between the first casing and the second casing, and the first casing and the second casing are rotatably connected to each other. The rotation of the rotating mechanism can drive the first casing and the second casing to rotate relative to each other. The first casing and the second casing are also provided with accommodating slots for accommodating electronic components and structural components such as processors, circuit boards, and camera modules of the electronic device. When the foldable electronic device is in the folded state, the display screen bends.

In this embodiment, the slider is provided between the first rotating rod and the second rotating rod, and the first rotating rod and the second rotating rod are driven to synchronously rotate through the sliding of the slider, to drive the first synchronous swing arm and the second synchronous swing arm to synchronously rotate. The rotating mechanism provided in this embodiment can implement synchronous rotation without synchronous gears, which can simplify the structure of the synchronous swing arm, thereby reducing the thickness of the rotating mechanism in the folded state and facilitating thinning of foldable electronic devices.

In an embodiment, the first rotating rod is provided with a first helical slot, the second rotating rod is provided with a second helical slot, the first helical slot extends around an axial direction of the first rotating rod, the second helical slot extends around an axial direction of the second rotating rod, and the first helical slot is opposite to the second helical slot. The slider includes a sliding body, a first protrusion, and a second protrusion, and the first protrusion and the second protrusion respectively protrude on two opposite sides of the sliding body. The first protrusion is slidably mounted in the first helical slot, and the second protrusion is slidably mounted in the second helical slot. The rotation of the first rotating rod can drive the first protrusion to slide along the first helical slot, and drive the slider to slide, so as to push the second protrusion to slide along the second helical slot.

In this embodiment, the first helical slot and the second helical slot are provided, and the slider slides in the first helical slot and the second helical slot, so that the first rotating rod and the second rotating rod synchronously rotate, thereby implementing synchronous rotation of the first synchronous swing arm and the second synchronous swing arm. This can further simplify the structure of the synchronous component and implement thinning of the foldable electronic device.

In an embodiment, the first rotating rod includes a first rotating sub-rod and a first rotating column, the first rotating column is fixedly connected to the first rotating sub-rod, a cross-sectional area of the first rotating column is larger than a cross-sectional area of the first rotating sub-rod, and the first helical slot is provided on an outer peripheral surface of the first rotating column. The second rotating rod includes a second rotating sub-rod and a second rotating column, the second rotating column is fixedly connected to the second rotating sub-rod, a cross-sectional area of the second rotating column is larger than a cross-sectional area of the second rotating sub-rod, and the second helical slot is provided on an outer peripheral surface of the second rotating column. The first rotating column and the second rotating column are provided side by side, directions of axis centers of the first rotating column, the second rotating column, the first rotating sub-rod, and the second rotating sub-rod are all parallel, and the slider is located between the first rotating column and the second rotating column.

In this embodiment, the first rotating column and the second rotating column with relatively large cross-sectional areas are provided, the first helical slot is provided on the first rotating column, the second helical slot is provided on the first rotating column, and the slider slides in the first helical slot and the second helical slot, to implement synchronous rotation of the first rotating column and the second rotating column, thereby implementing synchronous rotation of the first rotating sub-rod and the second rotating sub-rod and synchronous rotation of the first synchronous swing arm and the second synchronous swing arm. This can increase the stability of the connection between the slider and the first rotating rod and the second rotating rod.

In an embodiment, the first rotating sub-rod includes a first flat shaft section, an outer peripheral surface of the first flat shaft section includes a first flat surface section and a first cambered surface section, and the first flat surface section and the first cambered surface section are connected to each other. The first rotating column is provided with a first mounting hole, and a contour of an inner wall of the first mounting hole is consistent with an outer contour of the first flat shaft section. The first flat shaft section is at least partly mounted in the first mounting hole, and the rotation of the first rotating sub-rod can drive the first rotating column to synchronously rotate.

In this embodiment, the first flat shaft section is provided on the first rotating sub-rod, and the first mounting hole matched with the first flat shaft section is provided on the first rotating column, to fixedly connect the first rotating column and the first rotating sub-column, so that when the first rotating sub-rod rotates, the first rotating column can be driven to synchronously rotate, which can improve the reliability of the synchronous rotation of the rotating mechanism and further simplify the structure of the rotating mechanism.

In an embodiment, the second rotating sub-rod includes a second flat shaft section, an outer peripheral surface of the second flat shaft section includes a second flat surface section and a second cambered surface section, and the second flat surface section and the second cambered surface section are connected to each other. The second rotating column is provided with a second mounting hole, and a contour of an inner wall of the second mounting hole is consistent with an outer contour of the second flat shaft section. The second flat shaft section is at least partly mounted in the second mounting hole, and the rotation of the second rotating sub-rod can drive the second rotating column to synchronously rotate.

In this embodiment, the second flat shaft section is provided on the second rotating rod, and the second mounting hole matched with the second flat shaft section is provided on the second rotating column, to fixedly connect the second rotating column and the second rotating sub-column, so that when the second rotating sub-rod rotates, the second rotating column can be driven to synchronously rotate, which can improve the reliability of the synchronous rotation of the rotating mechanism and further simplify the structure of the rotating mechanism.

In an embodiment, the first synchronous swing arm is provided with a first rotating hole, a contour of an inner wall of the first rotating hole is consistent with an outer contour of the first flat shaft section, at least a part of the first flat shaft section is mounted in the first rotating hole, and the rotation of the first synchronous swing arm can drive the first rotating rod to synchronously rotate.

In this embodiment, the first rotating hole matched with the first flat shaft section is provided in the first synchronous swing arm, to fixedly connect the first synchronous swing arm and the first rotating rod, so that when the first synchronous swing arm rotates, the first rotating rod can be driven to synchronously rotate, which can improve the reliability of synchronous rotation of the rotating mechanism and further simplify the structure of the rotating mechanism.

In an embodiment, the second synchronous swing arm is provided with a second rotating hole, a contour of an inner wall of the second rotating hole is consistent with an outer contour of the second flat shaft section, at least a part of the second flat shaft section is mounted in the second rotating hole, and the rotation of the second synchronous swing arm can drive the second rotating rod to synchronously rotate.

In this embodiment, the first rotating hole matched with the first flat shaft section is provided in the second synchronous swing arm, to fixedly connect the first synchronous swing arm and the first rotating rod, so that when the first synchronous swing arm rotates, the first rotating rod can be driven to synchronously rotate, which can improve the reliability of synchronous rotation of the rotating mechanism and further simplify the structure of the rotating mechanism.

In an embodiment, the synchronous component further includes a fastening block and an elastic member, and the fastening block is fixedly mounted on the fastening base. The elastic member is mounted in the fastening block, the fastening block includes a first hinged body, and the first hinged body is rotatably mounted on the first rotating rod. The first synchronous swing arm includes a second hinged body, the first synchronous swing arm is fastened on the first rotating rod, the first hinged body and the second hinged body are hinged, when the first synchronous swing arm rotates, the first rotating rod can be driven to rotate, and the first hinged body and the second hinged body repeatedly squeeze the elastic member, so that the elastic member is switched between an expanded state and a compressed state.

In this embodiment, the first hinged body is disposed in the fastening block and the second hinged body is provided on the first synchronous swing arm, and when the first synchronous swing arm rotates, the second hinged body rotates relative to the first hinged body, to provide damping feel for the rotating mechanism and improve user experience.

In an embodiment, the fastening block is provided with a first shaft hole and a second shaft hole, the first shaft hole and the second shaft hole are arranged in parallel and at intervals, and the first shaft hole and the second shaft hole run through the fastening block in directions of axis centers of the first shaft hole and the second shaft hole. The fastening block is fixedly connected to the fastening base, the first rotating rod is mounted in the first shaft hole, and the first rotating rod can rotate in the first shaft hole, and the second rotating rod is mounted in the second shaft hole, and the second rotating rod can rotate in the second shaft hole.

In this embodiment, the first shaft hole and the second shaft hole are provided on the fastening block, and the first rotating rod is rotatably mounted in the first shaft hole and the second rotating rod is rotatably mounted in the second shaft hole, when the first synchronous swing arm rotates relative to the fastening base, the first rotating rod can be driven to rotate in the first shaft hole, and when the second synchronous swing arm rotates relative to the fastening base, the second rotating rod can be driven to rotate in the second shaft hole, thereby implementing that the first rotating rod and the second rotating rod are rotatably connected to the fastening base.

In an embodiment, the synchronous component further includes a first baffle and a second baffle, the first baffle and the second baffle are respectively located at two opposite ends of a moving direction of the slider, and are fixedly connected to the fastening base. In this embodiment, the first baffle and the second baffle are respectively provided at two opposite ends of the moving direction of the slider to block the slider, so that the slider can be prevented from detaching from the first rotating column or the second rotating column.

In an embodiment, the rotating mechanism further includes a first fastening plate and a second fastening plate, the first fastening plate is slidably connected to the first synchronous swing arm, and the second fastening plate is slidably connected to the second synchronous swing arm.

The first fastening plate is fixedly connected to the first casing of the foldable electronic device, and the second fastening plate is fixedly connected to the second casing of the foldable electronic device. When the first casing rotates relative to the fastening base, the first fastening plate is driven to rotate, thereby driving the first synchronous swing arm to rotate, and driving the second synchronous swing arm to rotate through the synchronous component, so as to drive the second casing to rotate relative to the fastening base through the second synchronous swing arm, thereby implementing the folding or unfolding of the rotating mechanism, and ensuring the rotation stability of the rotating mechanism and the foldable electronic device.

In an embodiment, the fastening base is provided with a first rotating slot and a second rotating slot, and the first rotating slot and the second rotating slot are provided opposite to each other. The rotating mechanism includes a first main swing arm and a second main swing arm, the first main swing arm is mounted in the first rotating slot, and can slide along the first rotating slot, and the first main swing arm is rotatably connected to the first fastening plate. The second main swing arm is mounted on the second rotating slot and can slide along the second rotating slot, and the second main swing arm is rotatably connected to the second fastening plate.

In this embodiment, the first main swing arm is provided and the first main swing arm is rotatably connected to the first fastening plate, so that when the first fastening plate rotates relative to the fastening base, the first main swing arm can be driven to move relative to the fastening base. The second main swing arm is provided and the second main swing arm is rotatably connected to the second fastening plate, and when the second fastening plate rotates relative to the fastening base, the second main swing arm can be driven to rotate relative to the fastening base, thereby further improving the rotation stability of the rotating mechanism and the foldable electronic device.

In an embodiment, the rotating mechanism includes a first secondary swing arm and a second secondary swing arm, and the first secondary swing arm is rotatably connected to the fastening base and is slidably connected to the first fastening plate. The second secondary swing arm is rotatably connected to the fastening base and is slidably connected to the second fastening plate.

In this embodiment, the first secondary swing arm is provided, and when the first fastening plate rotates relative to the fastening base, the first secondary swing arm and the first main swing arm are driven to rotate together, so that the first fastening plate rotates relative to the fastening base, to improve the rotation stability of the first fastening plate. The second secondary swing arm is provided, and when the second fastening plate rotates relative to the fastening base, the second secondary swing arm and the second main swing arm are driven to rotate together, so that the second fastening plate rotates relative to the fastening base, to improve the rotation stability of the second fastening plate.

In an embodiment, the rotating mechanism further includes a first pressing plate and a second pressing plate, the first pressing plate is slidably connected to the first fastening plate, and when the first fastening plate rotates relative to the fastening base, the first pressing plate can be driven to rotate relative to the fastening base. The second pressing plate is slidably connected to the second fastening plate, and when the second pressing plate rotates relative to the fastening base, the second pressing plate can be driven to rotate relative to the fastening base.

Both the first pressing plate and the second pressing plate are provided opposite to the display screen, and the first pressing plate and the second pressing plate jointly support the display screen, so as to increase the stability of the connection of the display screen and ensure good display of the display screen. In this embodiment, the rotation of the first fastening plate drives the rotation of the first pressing plate, and the rotation of the second fastening plate drives the rotation of the second pressing plate, thereby implementing folding and unfolding of the display screen. Moreover, the first pressing plate is slidably connected to the first fastening plate, and the second pressing plate is slidably connected to the second fastening plate, so that an angle between the first pressing plate and the second pressing plate can be adjusted, thereby adapting to a foldable angle of a foldable portion of the display screen.

In an embodiment, the first fastening plate is provided with a first guide slot, the first pressing plate includes a first guide slider, the first pressing plate is stacked with the first fastening plate, the first guide slider is located in the first guide slot, and the first guide slider can slide along the first guide slot.

The second fastening plate is provided with a third guide slot, the second pressing plate includes a third guide slider, the second pressing plate is stacked with the second fastening plate, the third guiding slider is located in the third guide slot, and the third guide slider can slide along the third guide slot.

In this embodiment, the first guide slider is provided on the first pressing plate, the first guide slot matched with the first guide slider is provided on the first fastening plate, and the first guide slider slides in the first guide slot, so that the first pressing plate is slidably connected to the first fastening plate, to improve the stability of the sliding of the first pressing plate relative to the first fastening plate. The third guide slider is provided on the second pressing plate, the third guide slot matched with the third guide slider is provided on the second fastening plate, and the third guide slider slides in the third guide slot, so that the second pressing plate is slidably connected to the second fastening plate, to improve the stability of the sliding of the second pressing plate relative to the second fastening plate.

In an embodiment, the rotating mechanism further includes a first pressing plate swing arm and a second pressing plate swing arm, an end of the first pressing plate swing arm is rotatably connected to the fastening base, and another end of the first pressing plate swing arm is slidably connected to the first pressing plate. An end of the second pressing plate swing arm is rotatably connected to the fastening base, and another end of the second pressing plate swing arm is slidably connected to the second pressing plate.

In this embodiment, the first pressing plate swing arm is provided and the first pressing plate drives the first pressing plate swing arm to rotate, so that the first pressing plate rotates relative to the fastening base, thereby improving the stability of the rotation of the first pressing plate. Moreover, the second pressing plate swing arm is provided and the second pressing plate drives the second pressing plate swing arm to rotate, so that the second pressing plate rotates relative to the fastening base, thereby improving the stability of the rotation of the second pressing plate.

In an embodiment, the rotating mechanism includes a first auxiliary fastening plate, a second auxiliary fastening plate, a first auxiliary swing arm, and a second auxiliary swing arm, the first auxiliary fastening plate and the first fastening plate are located on a same side of the fastening base, the first auxiliary fastening plate is spaced apart from the first fastening plate, and the first auxiliary swing arm is rotatably connected to the first auxiliary fastening plate and is rotatably connected to the fastening base.

The second auxiliary fastening plate and the second fastening plate are located on a same side of the fastening base, the second auxiliary fastening plate is spaced apart from the second fastening plate, and the second auxiliary swing arm is rotatably connected to the second auxiliary fastening plate and is rotatably connected to the fastening base.

The first auxiliary fastening plate is fixedly connected to the first casing of the foldable electronic device, and the second auxiliary fastening plate is fixedly connected to the second casing of the foldable electronic device. When the first casing rotates relative to the fastening base, the first auxiliary fastening plate is driven to rotate, thereby driving the first auxiliary swing arm to rotate. When the second casing rotates relative to the fastening base, the second auxiliary fastening plate is driven to rotate, to drive the second auxiliary swing arm to rotate, thereby implementing the folding or unfolding of the rotating mechanism. Therefore, this can further improve the rotation stability of the rotating mechanism and the foldable electronic device.

According to a second aspect, the present application provides a foldable electronic device, including a first casing, a second casing, a display screen, and the above-mentioned rotating mechanism. The rotating mechanism is connected between the first casing and the second casing, the display screen is mounted on the first casing, the second casing, and the rotating mechanism. When the rotating mechanism rotates, the first casing and the second casing rotate relative to each other, thereby driving the display screen to fold or unfold.

When the foldable electronic device is in an unfolded state, the first casing and the second casing are unfolded relative to each other, and the rotating mechanism is in an unfolded state. When the foldable electronic device is in a folded state, the first casing and the second casing are folded relative to each other, and the rotating mechanism is in a folded state.

To sum up, in the rotating mechanism provided by the present application, the slider is provided between the first rotating rod and the second rotating rod, and the first rotating rod and the second rotating rod are driven to synchronously rotate through the sliding of the slider, to drive the first synchronous swing arm and the second synchronous swing arm to synchronously rotate. The rotating mechanism provided in this embodiment can implement synchronous rotation without synchronous gears, which can simplify the structure of the synchronous component, thereby reducing the thickness of the rotating mechanism in the folded state and facilitating thinning of foldable electronic devices.

BRIEF DESCRIPTION OF THE DRAWINGS

To describe the technical solutions in the embodiments of the present application or the background more clearly, the following briefly describes the accompanying drawings required for describing the embodiments of the present application or the background.

DETAILED DESCRIPTION OF ILLUSTRATIVE EMBODIMENTS

The following describes the embodiments of the present application with reference to the accompanying drawings in the embodiments of the present application.

With the development of science and technologies, appearances (ID) of electronic devices (such as mobile phones and tablet computers) tend to develop from a straight form to a foldable form. A foldable device has a large screen in an unfolded state, which fully satisfies the visual experience of consumers, and is small in size and easy to carry in a folded state. However, most synchronous components of rotating mechanisms in the prior art perform synchronous movement through synchronous gears. However, the synchronous gears have complex structures, which increases thicknesses of the rotating mechanisms, and is not conducive to simplifying of structures and thinning of foldable electronic devices. The rotating mechanism provided by the present application can implement synchronous movement of the synchronous component without a synchronous gear, simplifies the structure of the rotating mechanism, and facilitates thinning of a foldable electronic device.

Figure 1:
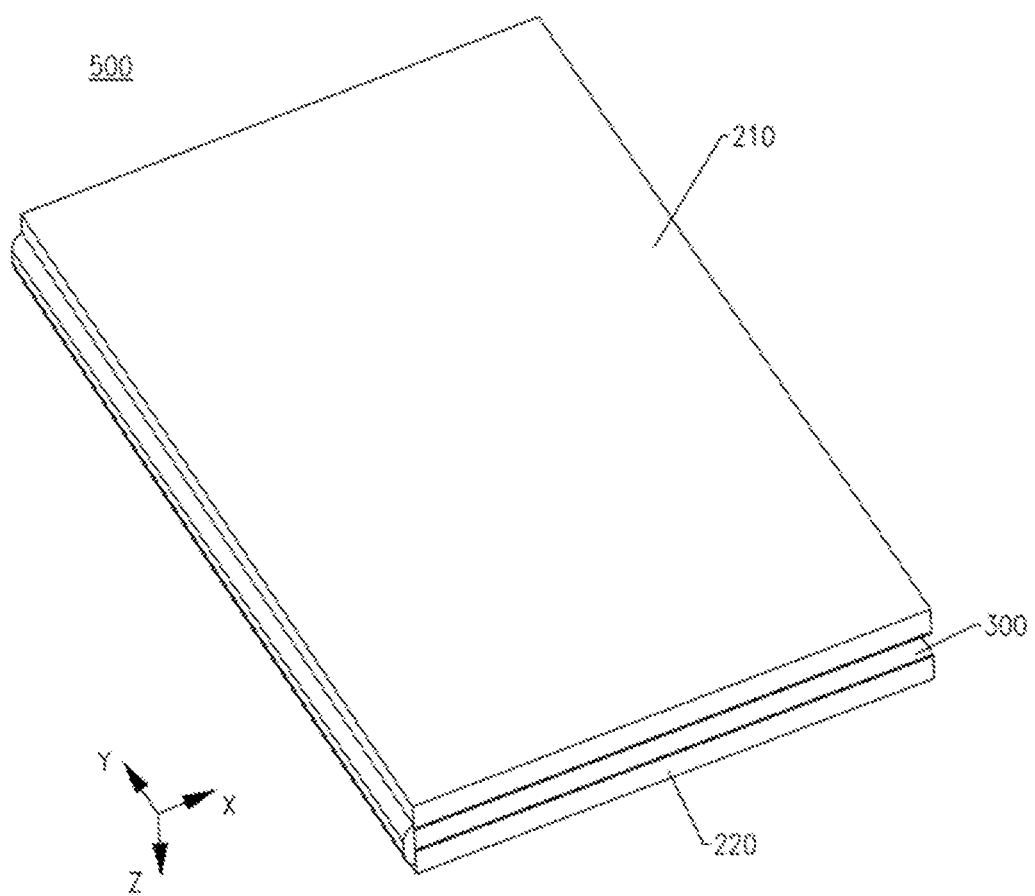
FIG. 1 is a schematic structural diagram of a foldable electronic device in a first state according to an embodiment of the present application.
Figure 2:
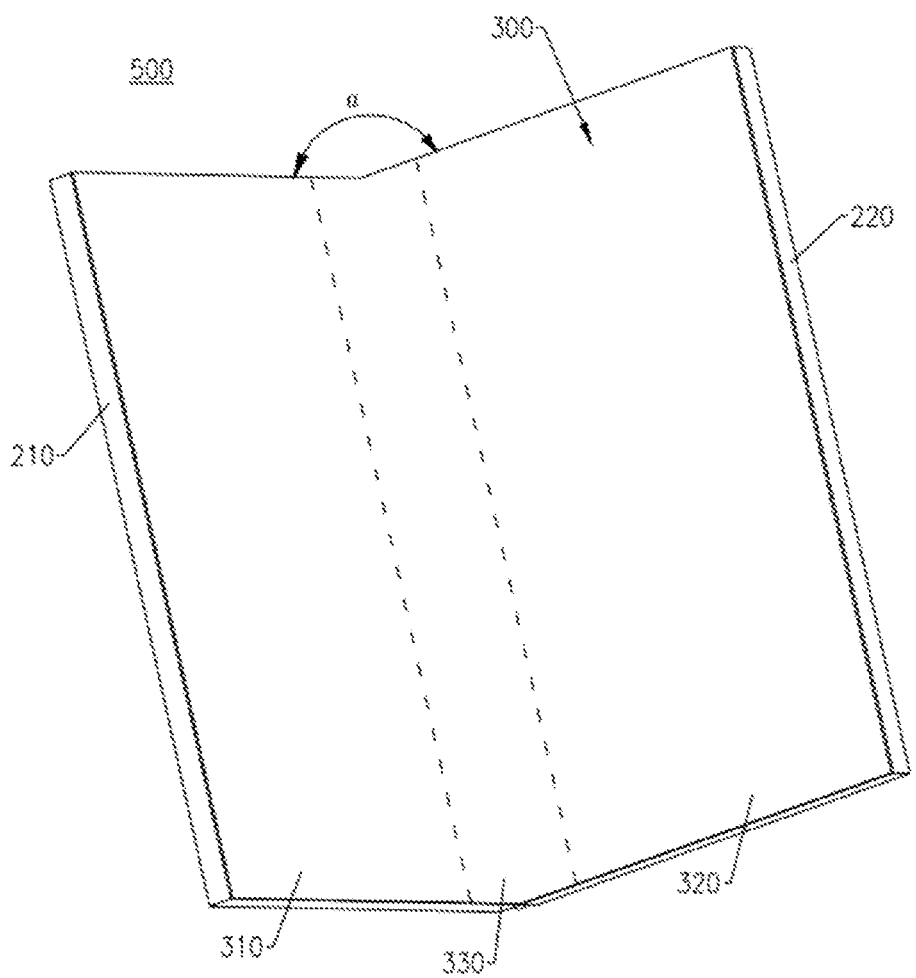
FIG. 2 is a schematic structural diagram of a foldable electronic device in a second state according to an embodiment of the present application.
Figure 3:
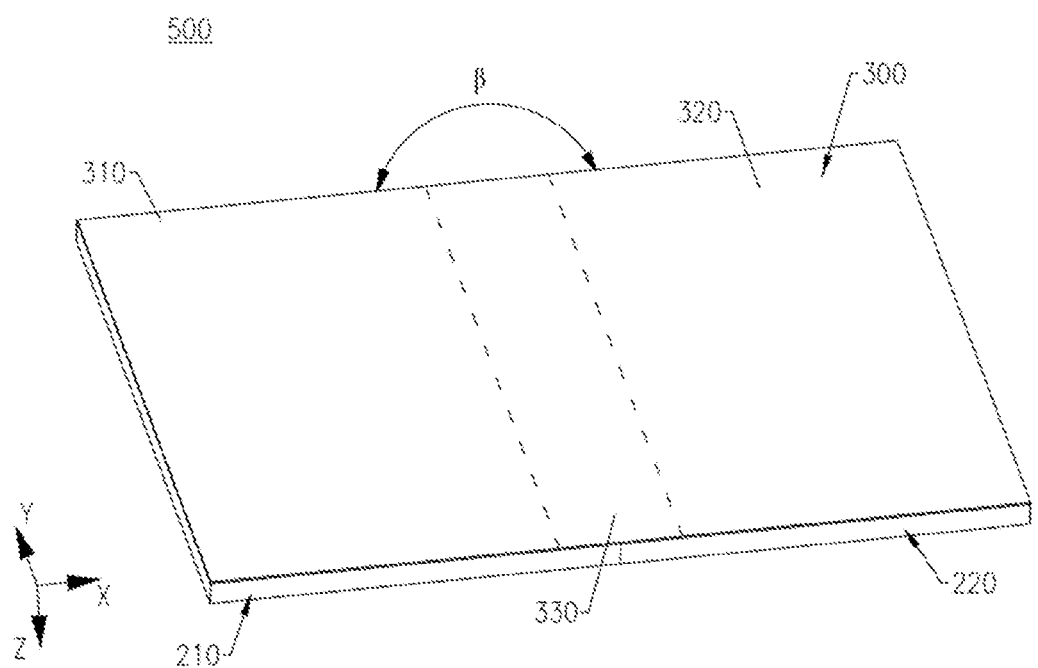
FIG. 3 is a schematic structural diagram of a foldable electronic device in a third state according to an embodiment of the present application.

Refer to FIG. 1 to FIG. 3. FIG. 1 is a structural schematic diagram of the foldable electronic device 500 in a first state according to an embodiment of the present application, FIG. 2 is a structural schematic diagram of the foldable electronic device 500 in a second state according to an embodiment of the present application, and FIG. 3 is a structural schematic diagram of the foldable electronic device 500 in a third state according to an embodiment of the present application.

For ease of description, a width direction of the foldable electronic device 500 is defined as a direction X, a length direction of the foldable electronic device 500 is defined as a direction Y, and a thickness direction of the foldable electronic device 500 is defined as a direction Z. The direction X, the direction Y, and the direction Z are perpendicular to each other.

The foldable electronic device 500 includes but is not limited to a cellphone (cellphone), a notebook computer (notebook computer), a tablet computer (tablet personal computer), a laptop computer (laptop computer), a personal digital assistant (personal digital assistant), a wearable device (wearable device), or an in-vehicle device (mobile device). In this embodiment of the present application, description is made by using an example in which the foldable electronic device 500 is a cellphone.

The foldable electronic device 500 shown in FIG. 1 is in a folded state, the foldable electronic device 500 shown in FIG. 2 is in a semi-unfolded state, and the foldable electronic device 500 shown in FIG. 3 is in an unfolded state. An unfolding angle α of the foldable electronic device 500 shown in FIG. 2 is 90, and an unfolding angle β of the foldable electronic device 500 shown in FIG. 3 is 180.

It should be noted that a slight deviation is allowed for all angles described by using an example in this embodiment of the present application. For example, that the unfoldable degree a of the foldable electronic device 500 shown in FIG. 2 is 90 means that α may be 90 degrees, or may be approximately 90 degrees, for example, 80 degrees, 85 degrees, 95 degrees, or 100 degrees. For another example, that the unfoldable angle β of the foldable electronic device 500 shown in FIG. 3 is 180 means that β may be 180 degrees, or may be approximately 180 degrees, for example, 0 degree, 5 degrees, 185 degrees, and 190 degrees. An example for description in the following may be used for same understanding.

The foldable electronic device 500 shown in the embodiments of the present application is an electronic device that can be folded once. In some other embodiments, the foldable electronic device 500 may alternatively be an electronic device that may be folded for a plurality of times (more than twice). In this case, the foldable electronic device 500 may include a plurality of parts, two adjacent parts may be folded relatively close to the foldable electronic device 500 in a foldable state, and two adjacent parts may be unfolded relatively far from the foldable electronic device 500 in an unfolded state.

Figure 4:
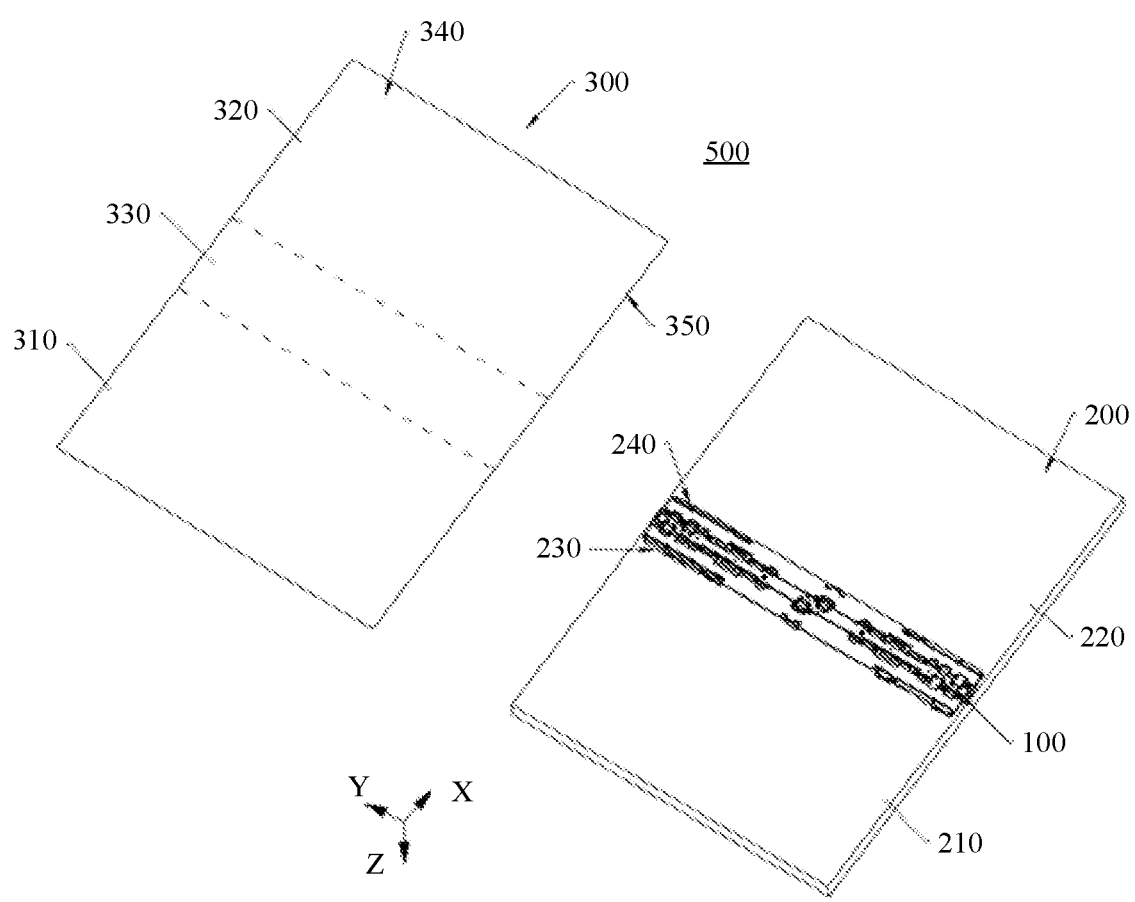
FIG. 4 is a schematic structural exploded view of the foldable electronic device shown in FIG. 3.

FIG. 4 is a schematic structural exploded view of the foldable electronic device 500 shown in FIG. 3.

The foldable electronic device 500 includes a foldable apparatus 200 and a display screen 300, and the display screen 300 is mounted in the foldable apparatus 200. The display screen 300 includes a display surface 340 and an installation surface 350, and the display surface 340 and the installation surface 350 are disposed opposite to each other. The display surface 340 is configured to display a text, an image, a video, and the like. The display screen 300 includes a first portion 310, a second portion 320, and a foldable portion 330. The foldable portion 330 is located between the first portion 310 and the second portion 320, and the foldable portion 330 can bend in the direction Y. The first portion 310, the second portion 320, and the foldable portion 330 together constitute the display screen 300. In this embodiment, the display screen 300 is a flexible display, such as an organic light-emitting diode (organic light-emitting diode, OLED) display screen, an active-matrix organic light-emitting diode (active-matrix organic light-emitting diode, AMOLED) display screen, a mini organic light-emitting diode (mini organic light-emitting diode) display screen, a micro organic light-emitting diode (micro organic light-emitting diode) display screen, a micro organic light-emitting diode (micro organic light-emitting diode) display screen, or a quantum dot light-emitting diode (quantum dot light emitting diodes, QLED) display screen.

The foldable apparatus 200 includes a first casing 210, a second casing 220, and a rotating mechanism 100, the first casing 210 is provided with a first mounting slot 230, the second casing 220 is provided with a second mounting slot 240, and the first mounting slot 230 communicates with the second mounting slot 240 to form a mounting slot. The rotating mechanism 100 is mounted in the mounting slot and fixedly connected to the first casing 210 and the second casing 220, to implement rotational connection between the first casing 210 and the second casing 220. The first casing 210 and the second casing 220 may rotate relative to each other through the rotating mechanism 100, so that the foldable apparatus 200 is switched between the folded state and the unfolded state. The first casing 210 and the second casing 220 are also provided with accommodating slots (not shown in the figure) for accommodating electronic components and structural components such as processors, circuit boards, and camera modules of the foldable electronic device 500.

That the relative rotation of the first casing 210 and the second casing 220 causes the foldable apparatus 200 to be in the folded state means that the first casing 210 and the second casing 220 rotate through the rotating mechanism 100 and approach each other. Surfaces of the first casing 210 and the second casing 220 carrying the display screen 300 are opposite to each other. In fact, in an application process, when the foldable apparatus 200 is fully folded, after the display screen 300 mounted on the first casing 210 and the second casing 220 is folded, the first portion 310 and the second portion 320 are stacked and partially in contact or certainly can be fully in contact. That the relative rotation of the first casing 210 and the second casing 220 causes the foldable apparatus 200 to be in the semi-unfolded state means that the first casing 210 and the second casing 220 rotate through the rotating mechanism 100 and move away from each other. An angle between the first casing 210 and the second casing 220 becomes larger and larger, and may be close to 90 degrees or equal to 90 degrees. That the relative rotation of the first casing 210 and the second casing 220 causes the foldable apparatus 200 to be in the unfolded state means that the first casing 210 and the second casing 220 rotate through the rotating mechanism 100 and move away from each other. An angle between the first casing 210 and the second casing 220 continues to increase, and may be close to 180 degrees or equal to 180 degrees.

The first casing 210, the second casing 220, and the rotating mechanism 100 are arranged in sequence along the direction X, and a sum of dimensions of the first casing, the second casing, and the rotating mechanism is a dimension of the foldable apparatus 200 in the direction X (including assembly tolerances and assembly gaps of the first casing, the second casing, and the rotating mechanism). A dimension of the foldable apparatus 200 in the X direction is the same as a dimension of the display screen 300 and the electronic device along the direction X. Certainly, an allowable tolerance range is included. Dimensions of the first casing 210, the second casing 220, and the rotating mechanism 100 along the direction Y are the same, and the dimensions may allow assembly or production tolerances. A dimension of the first casing 210, the second casing 220, and the rotating mechanism 100 along the direction Y is a dimension of the foldable apparatus 200 in the direction Y, and the dimension of the foldable apparatus 200 in the direction Y is the same as a dimension of the display screen 300 and the foldable electronic device 500 in the direction Y. Certainly, small deviations can also be allowed (assembly and production tolerances). The display screen 300 is mounted on the foldable apparatus 200, and the mounting surface 350 is fixedly connected to the foldable apparatus 200. Specifically, the first casing 210 carries the first portion 310, and the second casing 220 carries the second portion 320. In other words, the first portion 310 is mounted in the first casing 210, and the second portion 320 is mounted in the second casing 220. The rotating mechanism 100 is disposed opposite to the foldable portion 330.

Referring to FIG. 1, the first casing 210 and the second casing 220 rotate relative to each other through the rotating mechanism 100, and the first casing 210 and the second casing 220 approach each other, to drive the display screen 300 to be folded, so that the foldable electronic device 500 can be folded. When the foldable electronic device 500 is in the folded state, the foldable portion 330 of the display screen 300 is bent, and the first portion 310 and the second portion 320 are disposed opposite to each other. In this case, the display screen 300 is located between the first casing 210 and the second casing 220, which can greatly reduce the probability of damaging the display screen 300 and achieve effective protection for the display screen 300.

Refer to both FIG. 2 and FIG. 4. The first casing 210 and the second casing 220 rotate relative to each other through the rotating mechanism 100, and the first casing 210 and the second casing 220 move away from each other, to drive the display screen 300 to be unfolded, so that the foldable electronic device 500 is unfolded to a half-unfolded state. When the foldable electronic device 500 is in a half-unfolded state, an unfolding angle between the first casing 210 and the second casing 220 is a, and the first portion 310 and the second portion 320 are unfolded relative to each other, and drive the foldable portion 330 to be unfolded. In this case, an angle between the first portion 310 and the second portion 320 is a. In this embodiment, a is 90 degrees. In other embodiments, a may alternatively be around 90 degrees, 80 degrees, 85 degrees, 95 degrees, 100 degrees, or the like.

Refer to both FIG. 3 and FIG. 4. The first casing 210 and the second casing 220 rotate relative to each other through the rotating mechanism 100, and the first casing 210 and the second casing 220 move away from each other, to drive the display screen 300 to be further unfolded, until the foldable electronic device 500 is unfolded. When the foldable apparatus 200 is in the unfolded state, an angle between the first casing 210 and the second casing 220 is p. The foldable portion 330 is unfolded, and the first portion 310 and the second portion 320 are unfolded relative to each other. In this case, angles between the first portion 310, the second portion 320, and the foldable portion 330 are all P, and the display screen 300 has a large display region, so as to implement large-screen display of the foldable electronic device 500 and improve user experience. In this embodiment, P is 180 degrees. In other embodiments, β may alternatively be around 180 degrees, 0 degrees, 5 degrees, 185 degrees, 190 degrees, or the like.

Figure 5:
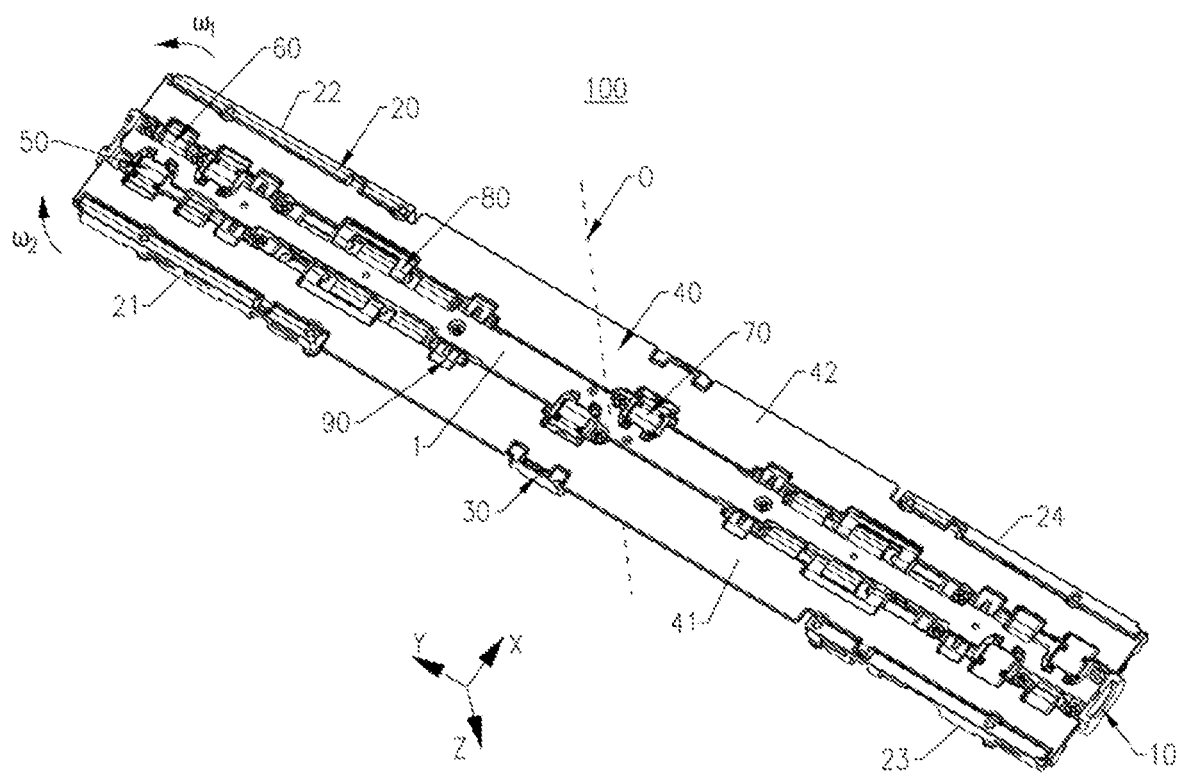
FIG. 5 is a schematic structural diagram of a rotating mechanism of the foldable electronic device shown in FIG. 4.
Figure 6:
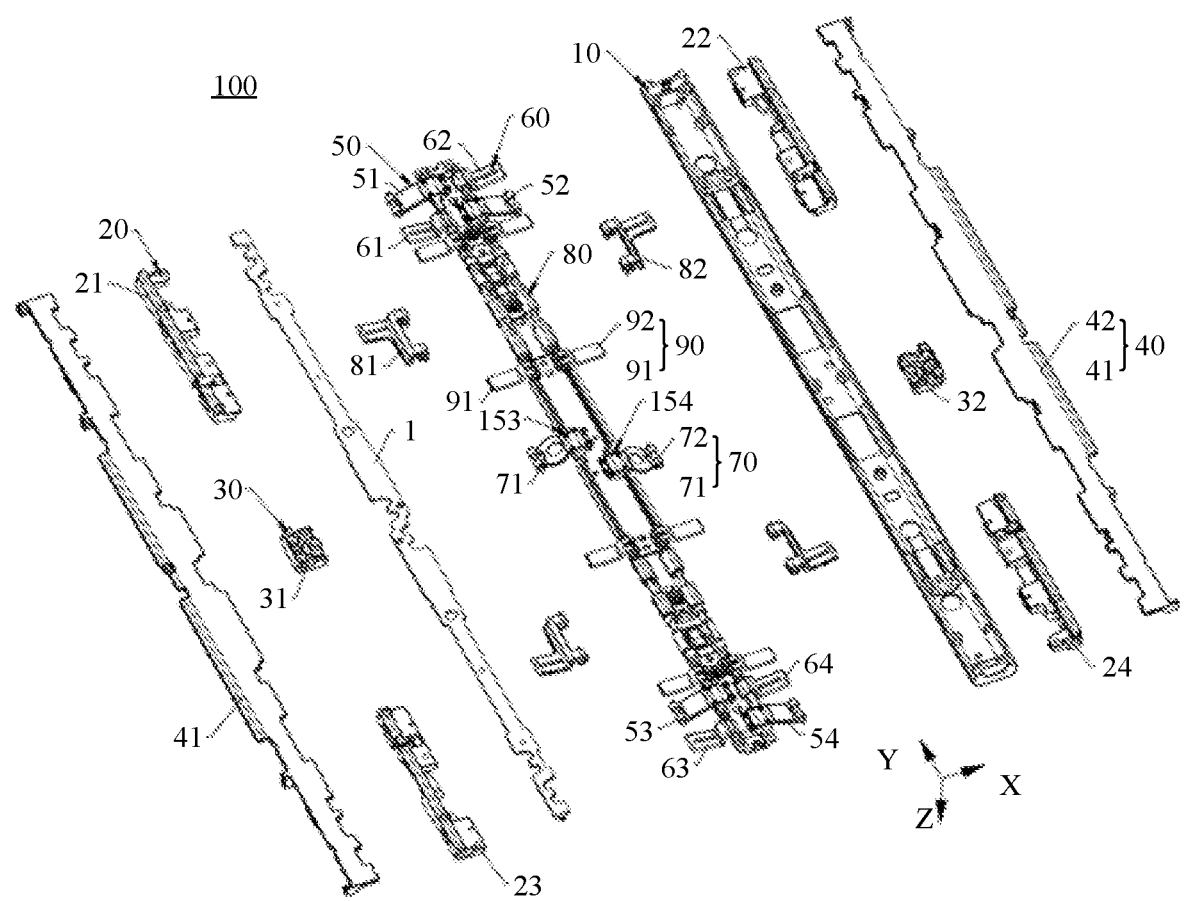
FIG. 6 is a schematic structural exploded view of the rotating mechanism shown in FIG. 5.

Refer to FIG. 5 and FIG. 6. FIG. 5 is a schematic structural diagram of a rotating mechanism 100 of the foldable electronic device 500 shown in FIG. 4, and FIG. 6 is a schematic structural exploded view of the rotating mechanism 100 shown in FIG. 5.

The rotating mechanism 100 includes a fastening base 10, a floating plate 1, a fastening plate 20, an auxiliary fastening plate 30, a pressing plate 40, a main swing arm 50, an auxiliary swing arm 70, a secondary swing arm 60, a pressing plate swing arm 90, and a synchronous component 80. The floating plate 1 is mounted on the fastening base 10 and can move relative to the fastening base 10 in the direction Z. The fastening plate 20 and the auxiliary fastening plate 30 are arranged at intervals along the direction Y, and the pressing plate 40 is mounted on the fastening plate 20 and the auxiliary fastening plate 30, and is slidably connected to the fastening plate 20 and the auxiliary fastening plate 30. The main swing arm 50, the auxiliary swing arm 70, the secondary swing arm 60, the synchronous component 80, and the pressing plate swing arm 90 are arranged at intervals along the length direction of the fastening base 10 and are all rotatably connected to the fastening base 10. The main swing arm 50 is rotatably connected to the fastening plate 20, the secondary swing arm 60 is slidably connected to the fastening plate 20, the synchronous component 80 is slidably connected to the fastening plate 20, the auxiliary swing arm 70 is rotatably connected to the auxiliary fastening plate 30, and the pressing plate swing arm 90 is slidably connected to the pressing plate 40. The foldable portion 330 of the display screen 300 is disposed opposite to the floating plate 1 and the pressing plate 40. When the fastening plate 20 and the auxiliary fastening plate 30 rotate relative to the fastening base 10, the fastening plate 20 drives the main swing arm 50, the secondary swing arm 60, and the synchronous component 80 to rotate relative to the fastening base 10, and the auxiliary fastening plate 30 drives the auxiliary swing arm 70 to rotate relative to the fastening base 10. Moreover, when the fastening plate 20 and the auxiliary fastening plate 30 rotate relative to the fastening base 10, the fastening plate and the auxiliary fastening plate jointly drive the pressing plate 40 to rotate relative to the fastening base 10, thereby driving the pressing plate swing arm 90 to rotate relative to the fastening base 10, and causing the pressing plate swing arm 90 to abut against or release the floating plate 1, so that the floating plate 1 moves in the direction Z relative to the fastening base 10. Therefore, this implements rotation of the rotating mechanism 100, so as to implement bending of the display screen 300.

Still referring to FIG. 5, for ease of description, a central axis O is provided in the present application. The central axis O is parallel to the direction Z, and the central axis O passes through the center of the rotating mechanism 100. The rotating mechanism 100 is centrally symmetrical about the central axis O. It should be noted that the fastening plate 20, the main swing arm 50, the secondary swing arm 60, the pressing plate swing arm 90, and the synchronous component 80 are a set of substructures. The entire rotating mechanism 100 has at least two sets of substructures, a set of substructures are provided at each of two opposite ends of the fastening base 10 in the direction Y, and the substructures located at the two opposite ends of the fastening base 10 are centrally symmetrical relative to the central axis O. That is, the fastening plate 20, the main swing arm 50, the secondary swing arm 60, the pressing plate swing arm 90, and the synchronous component 80 are provided at one end of the fastening base 10, and the fastening plate 20, the main swing arm 50, the secondary swing arm 60, the pressing plate swing arm 90, and the synchronous component 80 are also provided at the other end of the fastening base 10. To enhance the stability of the entire rotating mechanism 100, a set of substructures are added between the substructures at the two ends of the fastening base 10, and the substructures are located in the middle of the fastening base 10. To further enhance the stability of the entire rotating mechanism 100, two sets of substructures can also be added between the substructures at the two ends of the fastening base 10, and the two sets of substructures between the two ends of the fastening base 10 are centrally symmetrical about the central axis O. The number of the substructures can be adjusted according to actual conditions.

Figure 7:
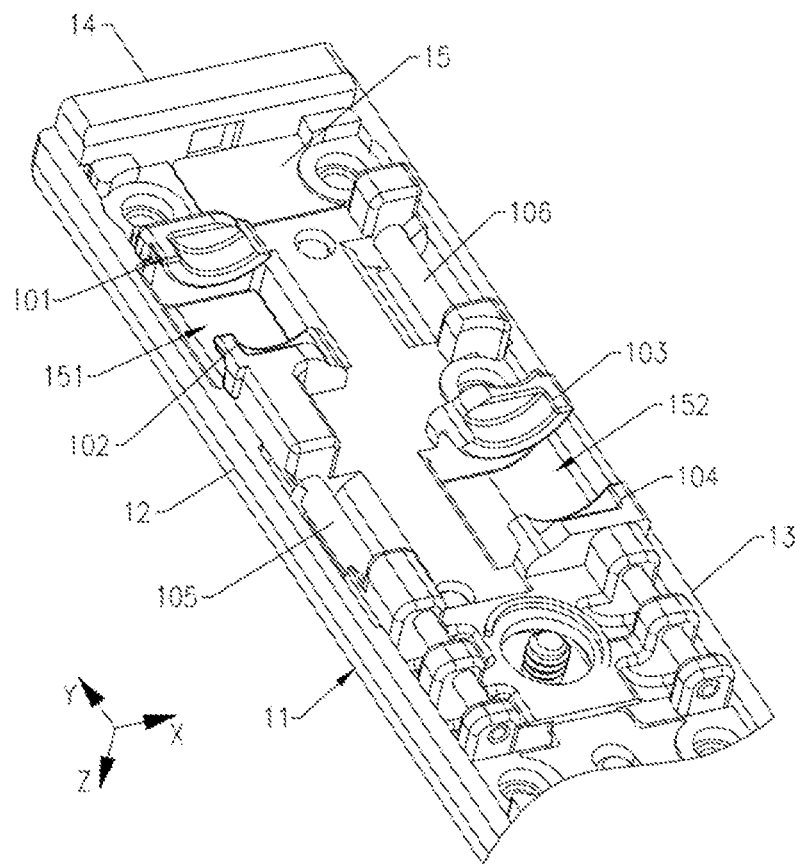
FIG. 7 is a partial schematic structural diagram of a fastening base in the rotating mechanism shown in FIG. 5.

FIG. 7 is a partial schematic structural diagram of the fastening base 10 in the rotating component 7 shown in FIG. 5.

The fastening base 10 includes a bottom plate 11, a first side plate 12, a second side plate 13, a first end plate 14, a second end plate (not shown in the figure), and a bearing plate 15. The first side plate 12 is disposed opposite to the second side plate 13, and the first side plate 12 and the second side plate 13 are respectively connected to two opposite sides of the bottom plate 11 in the direction X. The first end plate 14 is opposite to the second end plate, and the first end plate 14 and the second end plate are both connected between the first side plate 12 and the second side plate 13, and are respectively connected to two opposite sides of the bottom plate 11 in the direction Y. The bottom plate 11, the first side plate 12, the second side plate 13, the first end plate 14, and the second end plate jointly enclose to form an accommodating space with an opening, and the opening is disposed opposite to the bottom plate 11. The bearing plate 15 is located in the accommodating space and is fixedly connected to the bottom plate 11. In this embodiment, the bearing plate 15 and the bottom plate 11 are fixedly connected through bolts.

The bearing plate 15 is provided with a first rotating slot 151 and a second rotating slot 152, and the first rotating slot 151 and the second rotating slot 152 are opposite to each other, and are arranged in a misaligned manner in the direction Y. Besides, an opening of the first rotating slot 151 is located on the first side plate 12, and an opening of the second rotating slot 152 is located on the second side plate 13. In other embodiments, the first rotating slot 151 and the second rotating slot 152 may alternatively be arranged side by side in the direction Y. The first rotating slot 151 and the second rotating slot 152 are used for mounting the main swing arm 50, and the main swing arm 50 can slide and rotate in the first rotating slot 151 and the second rotating slot 152.

The fastening base 10 also includes a first slide rail 101, a second slide rail 102, a third slide rail 103, and a fourth slide rail 104. The first slide rail 101, the second slide rail 102, the third slide rail 103, and the fourth slide rail 104 are all arc-shaped plate structures. The first slide rail 101 and the second slide rail 102 are located in the first rotating slot 151, the first slide rail 101 and the second slide rail 102 are respectively fixedly connected to two opposite side walls of the first rotating slot 151, and the first slide rail 101 and the second slide rail 102 are arranged side by side along the direction Y. The first slide rail 101 and the second slide rail 102 are both spaced apart from a bottom wall of the first rotating slot 151. That is, there is a rotating space between the first slide rail 101 and the bottom wall of the first rotating slot 151 and between the second slide rail 102 and the bottom wall of the first rotating slot. The third slide rail 103 and the fourth slide rail 104 are located in the second rotating slot 152, the third slide rail 103 and the fourth slide rail 104 are respectively fixedly connected to two opposite side walls of the second rotating slot 152, and the third slide rail 103 and the fourth slide rail 104 are arranged side by side along the direction Y. Both the third slide rail 103 and the fourth slide rail 104 are spaced apart from the bottom wall of the second rotating slot 152. That is, there is a rotating space between the third slide rail 103 and the bottom wall of the second rotating slot 152 and between the fourth slide rail 104 and the bottom wall of the second rotating slot. In this embodiment, the first slide rail 101, the second slide rail 102, the third slide rail 103, the fourth slide rail 104, and the bearing plate 15 are integrally formed. In other embodiments, the first slide rail 101, the second slide rail 102, the third slide rail 103, and the fourth slide rail 104 may alternatively be fixedly connected to the bearing plate 15 through welding, bonding, or other connection methods. The first slide rail 101, the second slide rail 102, the third slide rail 103, the fourth slide rail 104, the first rotating slot 151, and the second rotating slot 152 are slidably connected to the main swing arm 50.

The fastening base 10 also includes a first rotating shaft 105 and a second rotating shaft 106. Both the first rotating shaft 105 and the second rotating shaft 106 are fixedly connected to the bearing plate 15, and extension directions of axis centers of the first rotating shaft 105 and the second rotating shaft 106 are both parallel to the direction Y. The first rotating shaft 105 is spaced apart from the first rotating slot 151 along the direction Y, and is disposed opposite to the second rotating slot 152. The second rotating shaft 106 is spaced apart from the second rotating slot 152 along the direction Y, and is disposed opposite to the first rotating slot 151. The first rotating shaft 105 and the second rotating shaft 106 are rotatably connected to the secondary swing arm 60.

It should be noted that FIG. 7 only shows a partial structure of the fastening base 10 in a positive direction of the Y-axis. The fastening base 10 is actually a central symmetric structure symmetrical about the central axis O. The bottom plate 11 is also provided with a third rotating slot and a fourth rotating slot (not shown in the figure). The third rotating slot and the fourth rotating slot are arranged at an end of the fastening base 10 away from the first rotating slot 151 and the second rotating slot 152. In addition, the third rotating slot and the second rotating slot 152 are centrally symmetrical about the central axis O, and the fourth rotating slot and the first rotating slot 151 are centrally symmetrical about the central axis O. The fastening base 10 also includes a third rotating shaft and a fourth rotating shaft (not shown in the figure). The third rotating shaft and the fourth rotating shaft are arranged at an end of the fastening base 10 away from the first rotating shaft 105 and the second rotating shaft 106. In addition, the third rotating shaft and the second rotating shaft are centrally symmetrical about the central axis O, and the fourth rotating shaft and the first rotating shaft are centrally symmetrical about the central axis O.

Also referring to FIG. 6, the bearing plate 15 is further provided with a first auxiliary rotating slot 153 and a second auxiliary rotating slot 154. The first auxiliary rotating slot 153 and the second auxiliary rotating slot 154 are located in the middle of the fastening base 10 in the direction Y, the first auxiliary rotating slot 153 is spaced apart from the first rotating slot 151, the second auxiliary rotating slot 154 is spaced apart from the second rotating slot 152, and the first auxiliary rotating slot 153 and the second auxiliary rotating slot 154 are arranged in a nonaligned manner in the direction Y. The first auxiliary rotating slot 153 and the second auxiliary rotating slot 154 are rotatably connected to the auxiliary swing arm 70.

Figure 8:
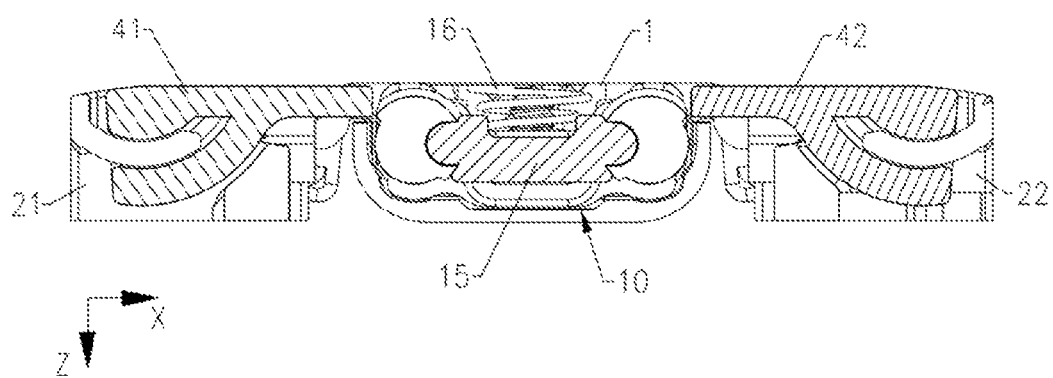
FIG. 8 is a sectional view of the rotating mechanism shown in FIG. 5.

Also refer to FIG. 6 and FIG. 8. FIG. 8 is a sectional view of the rotating mechanism 100 shown in FIG. 5.

The floating plate 1 is a planar structure. The floating plate 1 is mounted on the fastening base 10 and is disposed opposite to the bearing plate 15 in the direction Z. The fastening base 10 is provided with a first elastic member 16. In this embodiment, the first elastic member 16 is a spring. In other embodiments, the first elastic member 16 can also be made of other elastic materials. The first elastic member 16 is located in the accommodating space. One end of the first elastic member 16 is fixedly connected to the bearing plate 15, another end of the first elastic member 16 is fixedly connected to the floating plate 1, and an elastically stretched direction of the first elastic member 16 is parallel to the direction Z.

When the rotating mechanism 100 is in the unfolded state, the pressing plate swing arm 90 abuts against the floating plate 1, and the floating plate 1 pulls the first elastic member 16 so that the first elastic member 16 is in an elastically stretched state. When the rotating mechanism 100 is in the folded state, the foldable portion 330 of the display screen 300 bends and protrudes towards the floating plate 1, the pressing plate swing arm 90 releases the floating plate 1, the first elastic member 16 elastically retracts to a natural state, and an elastic retraction force of the elastic member 16 drives the floating plate 1 to move towards the fastening base 10 to avoid the display screen 300 and prevent the floating plate 1 from squeezing the display screen 300 and damaging the display screen 300. Certainly, when the rotating mechanism 100 is in the folded state, the first elastic member 16 can also be in a compressed state under the action of gravity of the floating plate 1.

Figure 9:
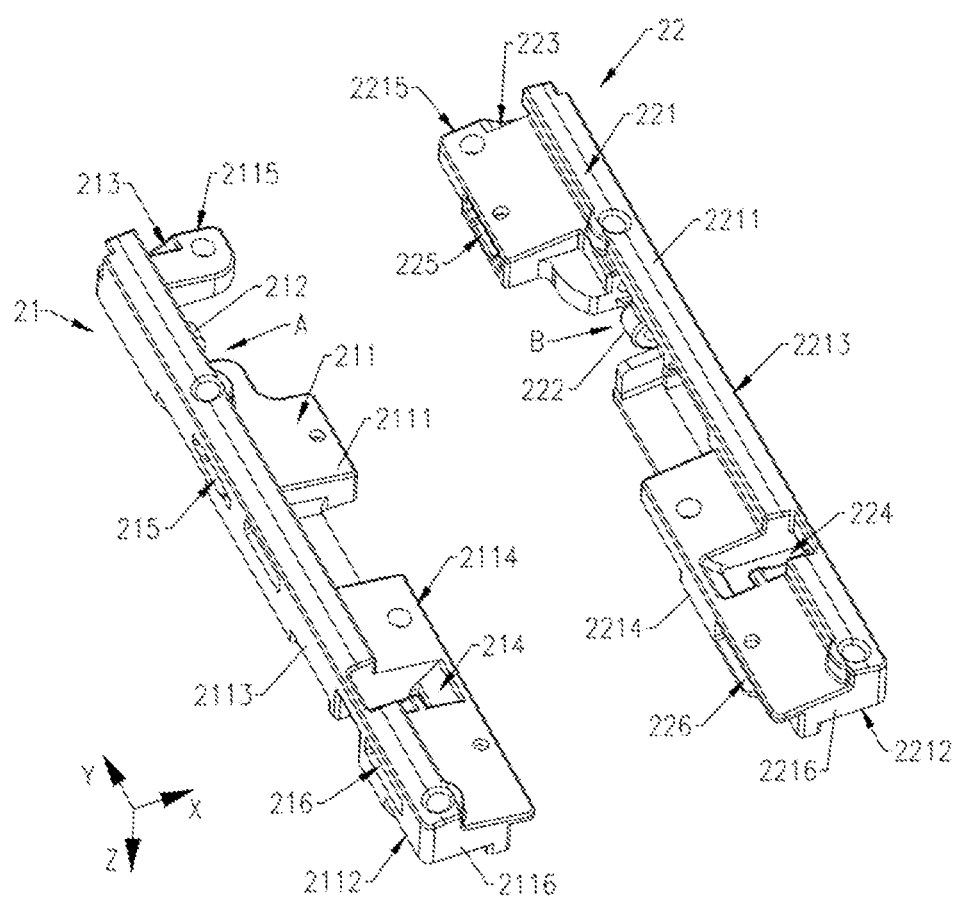
FIG. 9 is an enlarged schematic structural diagram of a first fastening plate and a second fastening plate in the rotating mechanism shown in FIG. 6.

FIG. 9 is an enlarged schematic structural diagram of a first fastening plate 21 and a second fastening plate 22 in the rotating mechanism 100 shown in FIG. 6.

The fastening plate 20 includes a first fastening plate 21 and a second fastening plate 22. The first fastening plate 21 is a strip-shaped plate structure. The first fastening plate 21 includes a first body 211 and a first sleeve 212. The first body 211 is a plate structure with a thickness. The first body 211 includes a first upper surface 2111, a first lower surface 2112, a first side surface 2113, a second side surface 2114, a first end surface 2115, and a second end surface 2116. The first upper surface 2111 is disposed opposite to the first lower surface 2112, the first side surface 2113 is disposed opposite to the second side surface 2114, and the first end surface 2115 is disposed opposite to the second end surface 2116. Both the first side surface 2113 and the second side surface 2114 are connected between the first upper surface 2111 and the first lower surface 2112, and both the first end surface 2115 and the second end surface 2116 are connected between the first side surface 2113 and the second side surface 2114. The first upper surface 2111, the first lower surface 2112, the first side surface 2113, the second side surface 2114, the first end surface 2115, and the second end surface 2116 jointly enclose to form an outer surface of the first body 211. The first body 211 is provided with a first notch A, the first notch A is located on the second side surface 2114, and the first notch A runs through the first upper surface 2111 and the first lower surface 2112. The first sleeve 212 is located in the first notch A and is fixedly connected to the first body 211, and an extension direction of the axis center of the first sleeve 212 is parallel to the direction Y. Two opposite ends of the first sleeve 212 in the direction Y are spaced apart from an inner wall of the first notch A in the direction Y. The first sleeve 212 is rotatably connected to the main swing arm 50.

The first body 211 is provided with a first guide slot 213, a second guide slot 214, a first slide slot 215, and a second slide slot 216. The first guide slot 213 and the second guide slot 214 are both arc-shaped. Both the first guide slot 213 and the second guide slot 214 are recessed on the first upper surface 2111 and run through the first side surface 2113. The first guide slot 213 is located on a side of the first end surface 2115 and runs through the first end surface 2115, and openings at two opposite ends of the first guide slot 213 respectively run through the first upper surface 2111 and the first side surface 2113. The second guide slot 214 is spaced apart from the first guide slot 213 along the direction Y, and the second guide slot 214 is located on a side near the second end surface 2116 and spaced apart from the second end surface 2116. Openings at two opposite ends of the second guide slot 214 respectively run through the first upper surface 2111 and the first side surface 2113. The first guide slot 213 and the second guide slot 214 are slidably connected to the pressing plate 40. The first slide slot 215 is located between the first notch A and the second guide slot 214, and is spaced apart from the first notch A and the second guide slot 214, and the first slide slot 215 runs through the first side surface 2113 and the second side surface 2114. The first slide slot 215 is slidably connected to the secondary swing arm 60. The second slide slot 216 is located between the second end surface 2116 and the second guide slot 214, and the second slide slot 216 runs through the first side surface 2113 and the second side surface 2114. The second slide slot 216 is slidably connected to the synchronous component 80.

Still referring to FIG. 9, the second fastening plate 22 is a strip-shaped plate structure. The second fastening plate 22 includes a second body 221 and a second sleeve 222. The second body 221 is a plate structure with a thickness. The second body 221 includes a second upper surface 2211, a second lower surface 2212, a third side surface 2213, a fourth side surface 2214, a third end surface 2215, and a fourth end surface 2216. The second upper surface 2211 is disposed opposite to the second lower surface 2212, the third side surface 2213 is disposed opposite to the fourth side surface 2214, and the third end surface 2215 is disposed opposite to the fourth end surface 2216. Both the third side surface 2213 and the fourth side surface 2214 are connected between the second upper surface 2211 and the second lower surface 2212, and both the third end surface 2215 and the fourth end surface 2216 are connected between the third side surface 2213 and the fourth side surface 2214. The second upper surface 2211, the second lower surface 2212, the third side surface 2213, the fourth side surface 2214, the third end surface 2215, and the fourth end surface 2216 jointly enclose to form an outer surface of the second body 221. The second body 221 is provided with a second notch B, the second notch B is located on the fourth side surface 2214, and the second notch B runs through the second upper surface 2211 and the second lower surface 2212. The second sleeve 222 is located in the second notch B and is fixedly connected to the second body 221, and an extension direction of the axis center of the second sleeve 222 is parallel to the direction Y. Two opposite ends of the second sleeve 222 in the direction Y are spaced apart from an inner wall of the second notch B in the direction Y. The second sleeve 222 is rotatably connected to the main swing arm 50.

The second body 221 is provided with a third guide slot 223, a fourth guide slot 224, a third slide slot 225, and a fourth slide slot 226. The third guide slot 223 and the fourth guide slot 224 are both arc-shaped. Both the third guide slot 223 and the fourth guide slot 224 are recessed on the second upper surface 2211 and run through the third side surface 2213. The third guide slot 223 is located on a side of the third end surface 2215 and runs through the third end surface 2215, and openings at two opposite ends of the third guide slot 223 respectively run through the second upper surface 2211 and the third side surface 2213. The fourth guide slot 224 is spaced apart from the third guide slot 223 along the direction Y, and the fourth guide slot 224 is located on a side near the fourth end surface 2216 and spaced apart from the fourth end surface 2216. Openings at two opposite ends of the fourth guide slot 224 respectively run through the second upper surface 2211 and the third side surface 2213. The third guide slot 223 and the fourth guide slot 224 are slidably connected to the pressing plate 40. The third slide slot 225 is located between the third guide slot 223 and the second notch B, and is spaced apart from the second notch B and the third guide slot 223, and the third slide slot 225 runs through the third side surface 2213 and the fourth side surface 2214. The third slide slot 225 is slidably connected to the secondary swing arm 60. The fourth slide slot 226 is located between the fourth end surface 2216 and the second guide slot 214, and the fourth slide slot 226 runs through the third side surface 2213 and the fourth side surface 2214. The fourth slide slot 226 is slidably connected to the synchronous component 80.

Also referring to FIG. 5 and FIG. 6, the first fastening plate 21 and the second fastening plate 22 are respectively located on two opposite sides of the fastening base 10 in the direction X. The first fastening plate 21 is fixedly connected to the first casing 210, and the first fastening plate 21 is rotatably connected to the fastening base 10 through the main swing arm 50 and the secondary swing arm 60. The rotation of the first casing 210 relative to the fastening base 10 can drive the first fastening plate 21 to rotate relative to the fastening base 10. The second fastening plate 22 is fixedly connected to the second casing 220, and the second fastening plate 22 is rotatably connected to the fastening base 10 through the main swing arm 50 and the secondary swing arm 60. The rotation of the second casing 220 relative to the fastening base 10 can drive the second fastening plate 22 to rotate relative to the fastening base 10.

The fastening plate 20 further includes a third fastening plate 23 and a fourth fastening plate 24. The structure of the third fastening plate 23 is the same as that of the second fastening plate 22, and the third fastening plate 23 and the second fastening plate 22 are centrally symmetrical about the central axis O. The structure of the fourth fastening plate 24 is the same as that of the first fastening plate 21, and the fourth fastening plate 24 and the first fastening plate 21 are centrally symmetrical about the central axis O. The third fastening plate 23 is fixedly connected to the first casing 210, and the third fastening plate 23 is spaced apart from the first fastening plate 21 along the direction Y. When the first casing 210 rotates relative to the fastening base 10, the first fastening plate 21 and the third fastening plate 23 are driven to simultaneously rotate relative to the fastening base 10. The fourth fastening plate 24 is fixedly connected to the second casing 220, and the fourth fastening plate 24 is spaced apart from the second fastening plate 22 along the direction Y. When the second casing 220 rotates relative to the fastening base 10, the second fastening plate 22 and the fourth fastening plate 24 are driven to simultaneously rotate relative to the fastening base 10.

In this embodiment, the first fastening plate 21 and the third fastening plate 23 are fixedly connected to the first casing 210 of the foldable electronic device 500. When the first casing 210 rotates relative to the fastening base 10, the first fastening plate 21 and the third fastening plate 23 are driven to rotate, to drive the main swing arm 50 and the secondary swing arm 60 to rotate, thereby increasing the stability of the connection between the first casing 210 and the rotating mechanism 100 and ensuring the rotation stability of the rotating mechanism 100 and the foldable electronic device 500. The second fastening plate 22 and the fourth fastening plate 24 are fixedly connected to the second casing 220. When the second casing 220 rotates relative to the fastening base 10, the second fastening plate 22 and the fourth fastening plate 24 are driven to rotate, to drive the main swing arm 50 and the secondary swing arm 60 to rotate, thereby implementing the folding or unfolding of the rotating mechanism 100 and further ensuring the rotation stability of the rotating mechanism 100 and the foldable electronic device 500.

Figure 10:
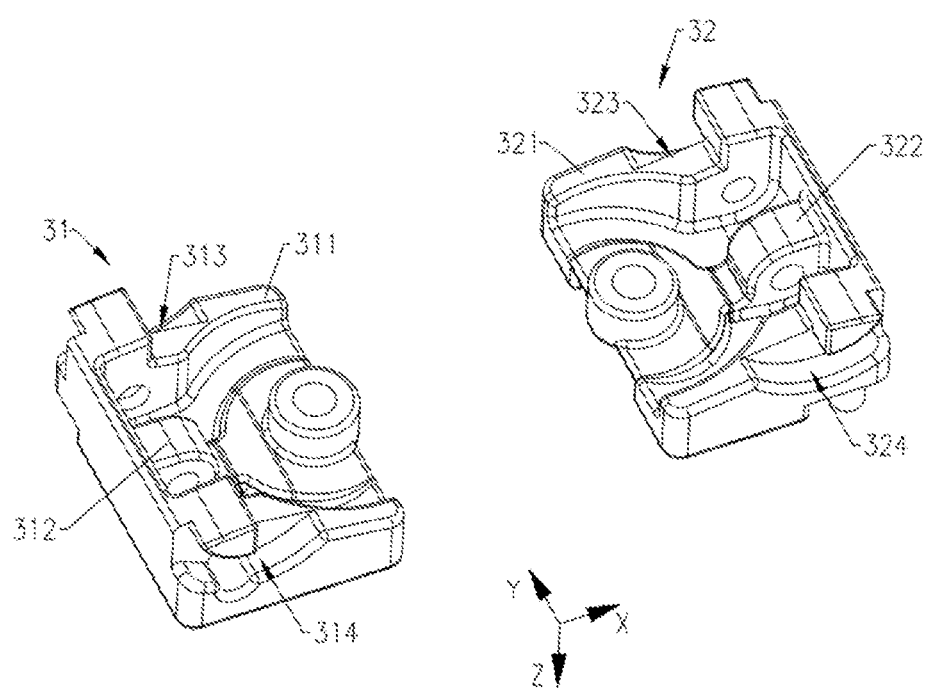
FIG. 10 is an enlarged schematic structural diagram of a first auxiliary fastening plate and a second auxiliary fastening plate in the rotating mechanism shown in FIG. 6.

FIG. 10 is an enlarged schematic structural diagram of a first auxiliary fastening plate 31 and a second auxiliary fastening plate 32 in the rotating mechanism 100 shown in FIG. 6.

The fastening plate 20 further includes a first auxiliary fastening plate 31 and a second auxiliary fastening plate 32. The first auxiliary fastening plate 31 includes a first auxiliary body 311 and a first auxiliary sleeve 312. The first auxiliary sleeve 312 is fixedly connected to the first auxiliary body 311, and the extension direction of the axis center of the first auxiliary sleeve 312 is parallel to the direction Y. The first auxiliary sleeve 312 is rotatably connected to the auxiliary swing arm 70. The first auxiliary body 311 is provided with a first auxiliary guide slot 313 and a second auxiliary guide slot 314. Inner walls of the first auxiliary guide slot 313 and the second auxiliary guide slot 314 are arc-shaped, and the first auxiliary guide slot 313 and the second auxiliary guide slot 314 are located at two opposite ends of the first auxiliary body 311 in the direction Y. The first auxiliary guide slot 313 and the second auxiliary guide slot 314 are slidably connected to the pressing plate 40.

The second auxiliary fastening plate 32 includes a second auxiliary body 321 and a second auxiliary sleeve 322. The second auxiliary sleeve 322 is fixedly connected to the second auxiliary body 321, and the extension direction of the axis center of the second auxiliary sleeve 322 is parallel to the direction Y. The second auxiliary sleeve 322 is rotatably connected to the auxiliary swing arm 70. The second auxiliary body 321 is provided with a third auxiliary guide slot 323 and a fourth auxiliary guide slot 324. Inner walls of the third auxiliary guide slot 323 and the fourth auxiliary guide slot 324 are arc-shaped, and the third auxiliary guide slot 323 and the fourth auxiliary guide slot 324 are located at two opposite ends of the second auxiliary body 321 in the direction Y. The third auxiliary guide slot 323 and the fourth auxiliary guide slot 324 are slidably connected to the pressing plate 40.

The first auxiliary fastening plate 31 and the second auxiliary fastening plate 32 are respectively located on two opposite sides of the fastening base 10 in the direction X. The first auxiliary fastening plate 31 is spaced apart from the first fastening plate 21 and the third fastening plate 23 along the direction Y, and the first auxiliary fastening plate 31 is located between the first fastening plate 21 and the third fastening plate 23. The first auxiliary fastening plate 31 is fixedly connected to the first casing 210, and the first auxiliary fastening plate 31 is rotatably connected to the fastening base 10 through the auxiliary swing arm 70. When the first casing 210 rotates relative to the fastening base 10, the first fastening plate 21, the third fastening plate 23, and the first auxiliary fastening plate 31 can be driven to simultaneously rotate relative to the fastening base 10.

In this embodiment, the first auxiliary fastening plate 31 is disposed between the first fastening plate 21 and the third fastening plate 23, and the first auxiliary fastening plate 31, the first fastening plate 21, and the third fastening plate 23 are all fixedly connected to the first casing 210, so that the stability of the connection between the first casing 210 and the rotating mechanism 100 can be increased. Moreover, when the first casing 210 rotates, the first auxiliary fastening plate 31, the first fastening plate 21, and the third fastening plate 23 are driven to simultaneously rotate, and the rotation stability of the first casing 210 can be improved by disposing the first auxiliary fastening plate 31. Meanwhile, the first auxiliary fastening plate 31 supports the pressing plate 40 together with the first fastening plate 21 and the third fastening plate 23, so that the strength of the pressing plate 40 can be improved.

The second auxiliary fastening plate 32 is spaced apart from the second fastening plate 22 and the fourth fastening plate 24 along the direction Y, and the second auxiliary fastening plate 32 is located between the second fastening plate 22 and the fourth fastening plate 24. The second auxiliary fastening plate 32 is fixedly connected to the second casing 220, and the second auxiliary fastening plate 32 is rotatably connected to the fastening base 10 through the auxiliary swing arm 70. When the second casing 220 rotates relative to the fastening base 10, the second fastening plate 22, the fourth fastening plate 24, and the second auxiliary fastening plate 32 can be driven to simultaneously rotate relative to the fastening base 10.

In this embodiment, the second auxiliary fastening plate 32 is disposed between the second fastening plate 22 and the fourth fastening plate 24, and the second auxiliary fastening plate 32, the second fastening plate 22, and the fourth fastening plate 24 are all fixedly connected to the second casing 220, so that the stability of the connection between the first casing 210 and the rotating mechanism 100 can be increased. Moreover, when the second casing 220 rotates, the second auxiliary fastening plate 32, the second fastening plate 22, and the fourth fastening plate 24 are driven to simultaneously rotate, and the rotation stability of the second casing 220 can be improved by disposing the second auxiliary fastening plate 32. Meanwhile, the second auxiliary fastening plate 32 supports the pressing plate 40 together with the second fastening plate 22 and the fourth fastening plate 24, so that the strength of the pressing plate 40 can be improved.

Figure 11:
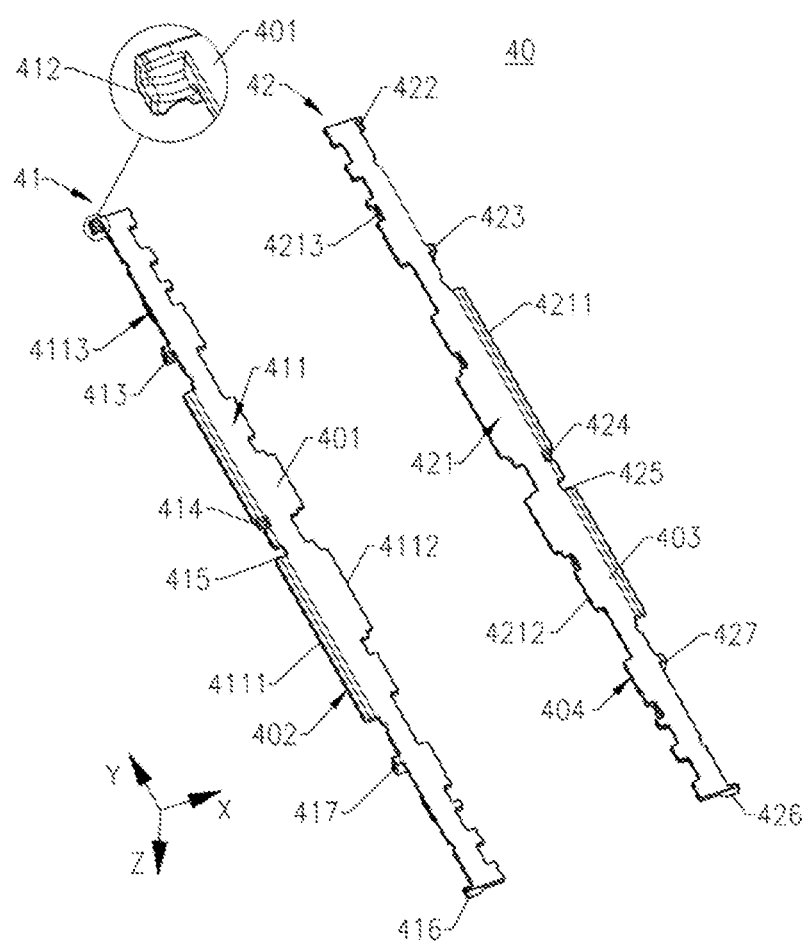
FIG. 11 is a partial enlarged schematic diagram of a first pressing plate and a second pressing plate in the rotating mechanism shown in FIG. 6.

FIG. 11 is a partial enlarged schematic diagram of a first pressing plate 41 and a second pressing plate 42 in the rotating mechanism 100 shown in FIG. 6.

The pressing plate 40 includes a first pressing plate 41 and a second pressing plate 42. The first pressing plate 41 includes a first body 411, a first guide slider 412, a second guide slider 413, a first auxiliary guide slider 414, and a second auxiliary guide slider 415. The first body 411 is a strip-shaped flat plate structure. The first body 411 includes a first side portion 4111, a second side portion 4112, a first top surface 401, and a first bottom surface 402, the first side portion 4111 and the second side portion 4112 are disposed opposite to each other, and the first side portion 4111 and the second side portion 4112 are respectively located on two opposite sides of the first body 411 in the direction X. The first top surface 401 and the first bottom surface 402 are disposed opposite to each other and are connected to the first side portion 4111 and the second side portion 4112. The first body 411 is provided with a first pressing plate slide slot 4113, and the first pressing plate slide slot 4113 runs through the first body 411 in a width direction of the first body 411. The first pressing plate slide slot 4113 is slidably connected to the pressing plate swing arm 90. In this embodiment, there are four first pressing plate slide slots 4113, the four first pressing plate slide slots 4113 are arranged at intervals along the direction Y, and the four first pressing plate slide slots 4113 are symmetrically arranged on the first pressing plate 41. In other embodiments, there can also be two, three, five, or more than five first pressing plate slide slots 4113.

The first guide slider 412, the second guide slider 413, the first auxiliary guide slider 414, and the second auxiliary guide slider 415 are all arc-shaped block structures. The first guide slider 412, the second guide slider 413, the first auxiliary guide slider 414, and the second auxiliary guide slider 415 are all located at the first side portion 4111 and fixedly connected to the first body 411. The first guide slider 412, the second guide slider 413, the first auxiliary guide slider 414, and the second auxiliary guide slider 415 all extend from the first side portion 4111 towards a direction away from the first body 411 and are curved towards the first top surface 401. In this embodiment, the first guide slider 412, the second guide slider 413, the first auxiliary guide slider 414, and the second auxiliary guide slider 415 are integrally formed with the first body 411. In other embodiments, the first guide slider 412, the second guide slider 413, the first auxiliary guide slider 414, and the second auxiliary guide slider 415 can also be fixedly connected to the first body 411 through welding, bonding, or other connection methods. The first guide slider 412 and the second guide slider 413 are arranged at intervals along the length direction of the first side portion 4111. The first guide slider 412 and the second guide slider 413 are slidably connected to the first fastening plate 21, a position of the first guide slider 412 corresponds to a position of the first guide slot 213, and a position of the second guide slider 413 corresponds to a position of the second guide slot 214.

The first auxiliary guide slider 414 and the second auxiliary guide slider 415 are arranged at intervals along the length direction of the first side portion 4111. The first auxiliary guide slider 414 and the second auxiliary guide slider 415 are slidably connected to the first auxiliary fastening plate 31, a position of the first auxiliary guide slider 414 corresponds to a position of the first auxiliary guide slot 313, and a position of the second auxiliary guide slider 415 corresponds to a position of the second auxiliary guide slot 314.

The first pressing plate 41 further includes a fifth guide slider 416 and a sixth guide slider 417. Both the fifth guide slider 416 and the sixth guide slider 417 are located at the first side portion 4111 and are fixedly connected to the first body 411. The fifth guide slider 416 and the first guide slider 412 are arranged symmetrically, and the sixth guide slider 417 and the second guide slider 413 are arranged symmetrically. The fifth guide slider 416 and the sixth guide slider 417 are slidably connected to the third fastening plate 23.

Still referring to FIG. 11, the second pressing plate 42 includes a second body 421, a third guide slider 422, a fourth guide slider 423, a third auxiliary guide slider 424, and a fourth auxiliary guide slider 425. The second body 421 is a strip-shaped flat plate structure. The second body 421 includes a third side portion 4211, a fourth side portion 4212, a second top surface 403, and a second bottom surface 404, the third side portion 4211 and the fourth side portion 4212 are disposed opposite to each other, and the third side portion 4211 and the fourth side portion 4212 are respectively located on two opposite sides of the second body 421 in the direction X. The second top surface 403 and the second bottom surface 404 are disposed opposite to each other and are connected between the third side portion 4211 and the fourth side portion 4212. The second body 421 is provided with a second pressing plate slide slot 4213, and the second pressing plate slide slot 4213 runs through the second body 421 in a width direction of the second body 421. The first pressing plate slide slot 4113 is slidably connected to the pressing plate swing arm 90. In this embodiment, there are four second pressing plate slide slots 4213, the four second pressing plate slide slots 4213 are arranged at intervals along the direction Y, and the four second pressing plate slide slots 4213 are symmetrically arranged on the second pressing plate 42. In other embodiments, there can also be two, three, five, or more than five second pressing plate slide slots 4213.

The third guide slider 422, the fourth guide slider 423, the third auxiliary guide slider 424, and the fourth auxiliary guide slider 425 are all arc-shaped block structures. The third guide slider 422, the fourth guide slider 423, the third auxiliary guide slider 424, and the fourth auxiliary guide slider 425 are all located at the third side portion 4211 and fixedly connected to the second body 421. The third guide slider 422, the fourth guide slider 423, the third auxiliary guide slider 424, and the fourth auxiliary guide slider 425 all extend from the third side portion 4211 towards a direction away from the second body 421 and are curved towards the second body 421.

In this embodiment, the third guide slider 422, the fourth guide slider 423, the third auxiliary guide slider 424, and the fourth auxiliary guide slider 425 are integrally formed with the second body 421. In other embodiments, the third guide slider 422, the fourth guide slider 423, the third auxiliary guide slider 424, and the fourth auxiliary guide slider 425 can also be fixedly connected to the second body 421 through welding, bonding, or other connection methods. The third guide slider 422 and the fourth guide slider 423 are arranged at intervals along the length direction of the third side portion 4211. The third guide slider 422 and the fourth guide slider 423 are slidably connected to the second fastening plate 22, a position of the third guide slider 422 corresponds to a position of the third guide slot 223, and a position of the fourth guide slider 423 corresponds to a position of the fourth guide slot 224.

The third auxiliary guide slider 424 and the fourth auxiliary guide slider 425 are arranged at intervals along the length direction of the third side portion 4211. The third auxiliary guide slider 424 and the fourth auxiliary guide slider 425 are slidably connected to the second auxiliary fastening plate 32, a position of the third auxiliary guide slider 424 corresponds to a position of the third auxiliary guide slot 323, and a position of the fourth auxiliary guide slider 425 corresponds to a position of the fourth auxiliary guide slot 324.

The second pressing plate 42 further includes a seventh guide slider 426 and an eighth guide slider 427. Both the seventh guide slider 426 and the eighth guide slider 427 are located at the third side portion 4211 and are fixedly connected to the second body 421. The seventh guide slider 426 and the third guide slider 422 are arranged symmetrically, and the eighth guide slider 427 and the fourth guide slider 423 are arranged symmetrically. The seventh guide slider 426 and the eighth guide slider 427 are slidably connected to the fourth fastening plate 24.

Figure 12:
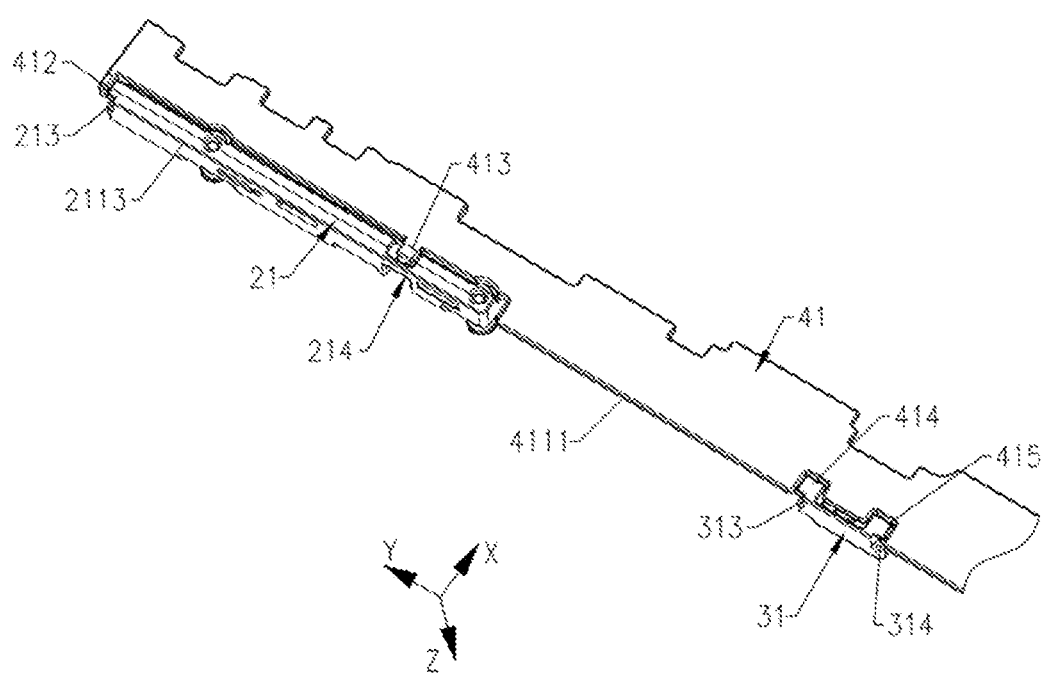
FIG. 12 is a partial schematic structural diagram of the rotating mechanism shown in FIG. 5.

Refer to FIG. 5, FIG. 6, and FIG. 12. FIG. 12 is a partial schematic structural diagram of the rotating mechanism 100 shown in FIG. 5.

The first pressing plate 41 and the second pressing plate 42 are respectively located on two opposite sides of the fastening base 10 in the direction X, and the first pressing plate 41 and the second pressing plate 42 are symmetrical structures. The first fastening plate 21, the first auxiliary fastening plate 31, and the third fastening plate 23 are arranged at intervals along the direction Y, and the first auxiliary fastening plate 31 is located between the first fastening plate 21 and the third fastening plate 23. The first pressing plate 41 is stacked on surfaces of the first fastening plate 21, the first auxiliary fastening plate 31, and the third fastening plate 23, and the first side portion 4111 and the first side surface 2113 of the first fastening plate 21 face a same direction. The first guide slider 412 is mounted in the first guide slot 213, and the first guide slider 412 can slide along the first guide slot 213. The second guide slider 413 is mounted in the second guide slot 214, and the second guide slider 413 can slide along the second guide slot 214. The first auxiliary guide slider 414 is mounted in the first auxiliary guide slot 313, and the first auxiliary guide slider 414 can slide along the first auxiliary guide slot 313. The second auxiliary guide slider 415 is mounted in the second auxiliary guide slot 314, and the second auxiliary guide slider 415 can slide along the second auxiliary guide slot 314. The fifth guide slider 416 and the sixth guide slider 417 are mounted in the guide slot of the third fastening plate 23. Moreover, the first pressing plate 41 is rotatably connected to the fastening base 10 through the pressing plate swing arm 90. When the first fastening plate 21, the third fastening plate 23, and the first auxiliary fastening plate 31 rotate relative to the fastening base 10, the first pressing plate 41 can be driven to rotate relative to the fastening base 10. At the same time, the first guide slider 412 and the second guide slider 413 drive the first pressing plate 41 to slide in an arc relative to the first fastening plate 21, the fifth guide slider 416 and the sixth guide slider 417 drive the first pressing plate 41 to slide in an arc relative to the third fastening plate 23, and the first auxiliary guide slider 414 and the second auxiliary guide slider 415 drive the first pressing plate 41 to slide in an arc relative to the first auxiliary fastening plate 31.

The second fastening plate 22, the second auxiliary fastening plate 32, and the fourth fastening plate 24 are arranged at intervals along the direction Y, and the second auxiliary fastening plate 32 is located between the second fastening plate 22 and the fourth fastening plate 24. The second pressing plate 42 is stacked on surfaces of the second fastening plate 22, the second auxiliary fastening plate 32, and the fourth fastening plate 24, and the third side portion 4211 and the third side surface 2213 of the second fastening plate 22 face a same direction. The third guide slider 422 is mounted in the third guide slot 223, and the third guide slider 422 can slide along the third guide slot 223. The fourth guide slider 423 is mounted in the fourth guide slot 224, and the fourth guide slider 423 can slide along the fourth guide slot 224. The third auxiliary guide slider 424 is mounted in the third auxiliary guide slot 323, and the third auxiliary guide slider 424 can slide along the third auxiliary guide slot 323. The fourth auxiliary guide slider 425 is mounted in the fourth auxiliary guide slot 324, and the fourth auxiliary guide slider 425 can slide along the fourth auxiliary guide slot 324. The seventh guide slider 426 and the eighth guide slider 427 are mounted in the guide slot of the fourth fastening plate 24. Moreover, the second pressing plate 42 is rotatably connected to the fastening base 10 through the pressing plate swing arm 90. When the second fastening plate 22, the fourth fastening plate 24, and the second auxiliary fastening plate 32 rotate relative to the fastening base 10, the second pressing plate 42 can be driven to rotate relative to the fastening base 10. At the same time, the third guide slider 422 and the fourth guide slider 423 drive the second pressing plate 42 to slide in an arc relative to the second fastening plate 22, the seventh guide slider 426 and the eighth guide slider 427 drive the second pressing plate 42 to slide in an arc relative to the fourth fastening plate 24, and the third auxiliary guide slider 424 and the fourth auxiliary guide slider 425 drive the second pressing plate 42 to slide in an arc relative to the second auxiliary fastening plate 32.

The first pressing plate 41 and the second pressing plate 42 are both disposed opposite to the display screen 300. That is, orthographic projections of the display screen 300 on the first pressing plate 41 and the second pressing plate 42 completely cover the first pressing plate 41 and the second pressing plate 42, or partially cover the first pressing plate 41 and the second pressing plate. The first pressing plate 41 and the second pressing plate 42 jointly support the display screen 300, so as to increase the stability of the connection of the display screen 300 and ensure good display of the display screen. In this embodiment, the rotation of the first fastening plate 21, the third fastening plate 23, and the first auxiliary fastening plate 31 drives the first pressing plate 41 to rotate, and the rotation of the second fastening plate 22, the fourth fastening plate 24, and the second auxiliary fastening plate 32 drives the second pressing plate 42 to rotate, thereby implementing the folding and unfolding of the display screen 300. Moreover, the arc-shaped guide slider is disposed on the first pressing plate 41 and the guide slot is disposed on the first fastening plate 21, so that the first pressing plate 41 and the first fastening plate 21 can be slidably connected to each other. Besides, the first pressing plate 41 can slide in an arc relative to the first fastening plate 21. The arc-shaped guide slider is disposed on the second pressing plate 42 and the guide slot is disposed on the second fastening plate 22, so that the second pressing plate 42 and the second fastening plate 22 can be slidably connected to each other. Besides, the second pressing plate 42 can slide in an arc relative to the second fastening plate 22. When the first fastening plate 21 and the second fastening plate 22 rotate, the first pressing plate 41 and the second pressing plate 42 rotate relative to each other, the first pressing plate 41 slides in an arc relative to the first fastening plate 21, and the second pressing plate 42 slides in an arc relative to the second fastening plate 22, so that an angle between the first pressing plate 41 and the second pressing plate 42 can be adjusted and the foldable angle of the foldable portion 330 of the display screen 300 can be adapted to, so as to avoid that when the rotating mechanism 100 is in a folded state, the first pressing plate 41 and the second pressing plate 42 squeeze the display screen 300. That is, when the rotating mechanism 100 is in the folded state, the angle between the first fastening plate 21 and the second fastening plate 22 is different from the angle between the first pressing plate 41 and the second pressing plate 42. Besides, the angle between the first pressing plate 41 and the second pressing plate 42 can be adjusted according to the bending angle of the display screen 300 to adapt to the bending of the display screen 300.

Figure 13:
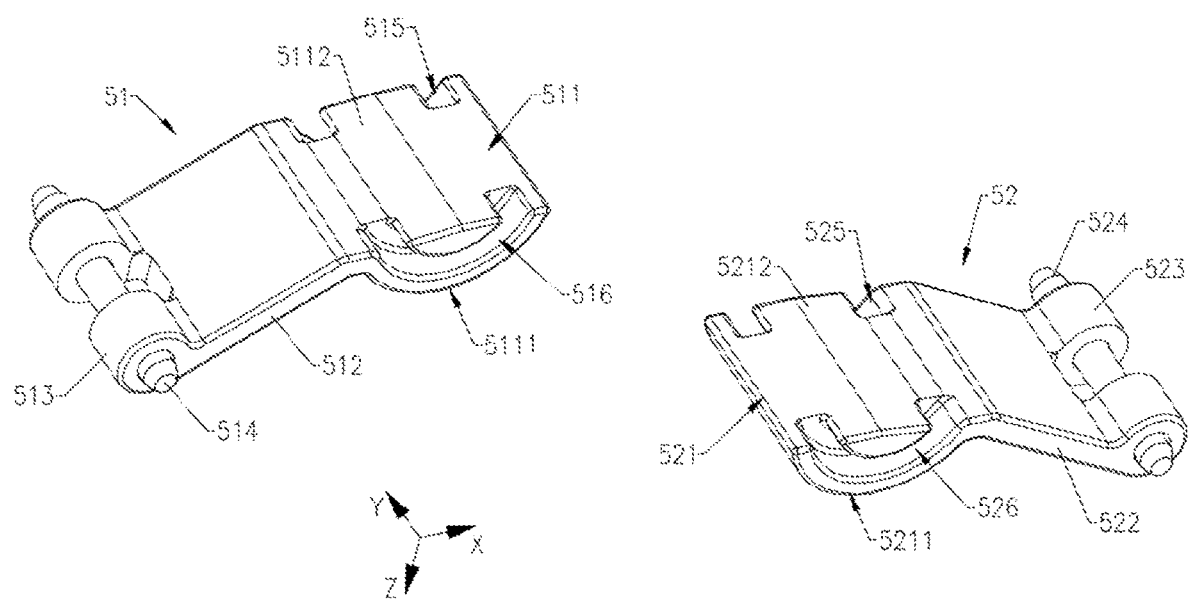
FIG. 13 is an enlarged schematic structural diagram of a first main swing arm and a second main swing arm in the rotating mechanism shown in FIG. 6.

FIG. 13 is an enlarged schematic structural diagram of a first main swing arm 51 and a second main swing arm 52 in the rotating mechanism 100 shown in FIG. 6.

The main swing arm 50 includes a first main swing arm 51 and a second main swing arm 52. The first main swing arm 51 includes a first rotating body 511, a first swing body 512, a first shaft seat 513, and a first rotating shaft 514. The first swing body 512 is in the shape of a planar plate. An extension direction of the axis center of the first shaft seat 513 is parallel to the direction Y, and the first shaft seat 513 is fixedly connected to the first swing body 512. The first rotating shaft 514 is located inside the first shaft seat 513 and fixedly connected to the first shaft seat 513, and the direction of the axis center of the first rotating shaft 514 is parallel to the Y direction. The first rotating body 511 is fixedly connected to an end of the first swing body 512 away from the first shaft seat 513. The first rotating body 511 includes a first rotating surface 5111 and a first support surface 5112, and the first rotating surface 5111 is disposed opposite to the first support surface 5112. The first rotating surface 5111 is arc-shaped, and a radian of the first rotating surface 5111 is the same as that of a bottom wall of the first rotating slot 151. Certainly, the arc shapes of the first rotating surface 5111 and the bottom wall of the first rotating slot 151 may slightly deviate.

The first support surface 5112 is a flat surface. When the first main swing arm 51 is unfolded relative to the fastening base 10, the first support surface 5112 is substantially on a same plane as the outer surface of the floating plate 1. The first rotating body 511 is further provided with a first arc-shaped slot 515 and a second arc-shaped slot 516. The first arc-shaped slot 515 and the second arc-shaped slot 516 are respectively located on two opposite sides of the first rotating body 511 in the direction Y. Openings at two opposite ends of the first arc-shaped slot 515 both run through the first support surface 5112, and the first arc-shaped slot 515 is used to cooperate with the first slide rail 101. Openings at two opposite ends of the second arc-shaped slot 516 both run through the first support surface 5112, and the second arc-shaped slot 516 is used to cooperate with the second slide rail 102. The first main swing arm 51 is rotatably connected to the fastening base 10 and rotatably connected to the first fastening plate 21.

A structure of the second main swing arm 52 is the same as that of the first main swing arm 51. The second main swing arm 52 includes a second rotating body 521, a second swing body 522, a second shaft seat 523, and a second rotating shaft 524. The second swing body 522 is in the shape of a planar plate. An extension direction of the axis center of the second shaft seat 523 is parallel to the direction Y, and the second shaft seat 523 is fixedly connected to the second swing body 522. The second rotating shaft 524 is located inside the second shaft seat 523 and fixedly connected to the second shaft seat 523, and the direction of the axis center of the second rotating shaft 524 is parallel to the direction Y. The second rotating body 521 is fixedly connected to an end of the second swing body 522 away from the second shaft seat 523. The second rotating body 521 includes a second rotating surface 5211 and a second support surface 5212, and the second rotating surface 5211 is disposed opposite to the second support surface 5212. The second rotating surface 5211 is arc-shaped, and a radian of the second rotating surface 5211 is the same as that of a bottom wall of the second rotating slot 152. Certainly, the are shapes of the second rotating surface 5211 and the bottom wall of the second rotating slot 152 may slightly deviate.

The second support surface 5212 is a flat surface. When the second main swing arm 52 is unfolded relative to the fastening base 10, the second support surface 5212 is substantially on a same plane as the outer surface of the floating plate 1. The second rotating body 521 is provided with a third arc-shaped slot 525 and a fourth arc-shaped slot 526. The third arc-shaped slot 525 and the fourth arc-shaped slot 526 are respectively located on two opposite sides of the second rotating body 521 in the direction Y. Openings at two opposite ends of the third arc-shaped slot 525 both run through the second support surface 5212, and the third arc-shaped slot 525 is used to cooperate with the third slide rail 103. Openings at two opposite ends of the fourth arc-shaped slot 526 both run through the second support surface 5212, and the fourth arc-shaped slot 526 is used to cooperate with the fourth slide rail 104. The second main swing arm 52 is rotatably connected to the fastening base 10 and rotatably connected to the second fastening plate 22.

Figure 14:
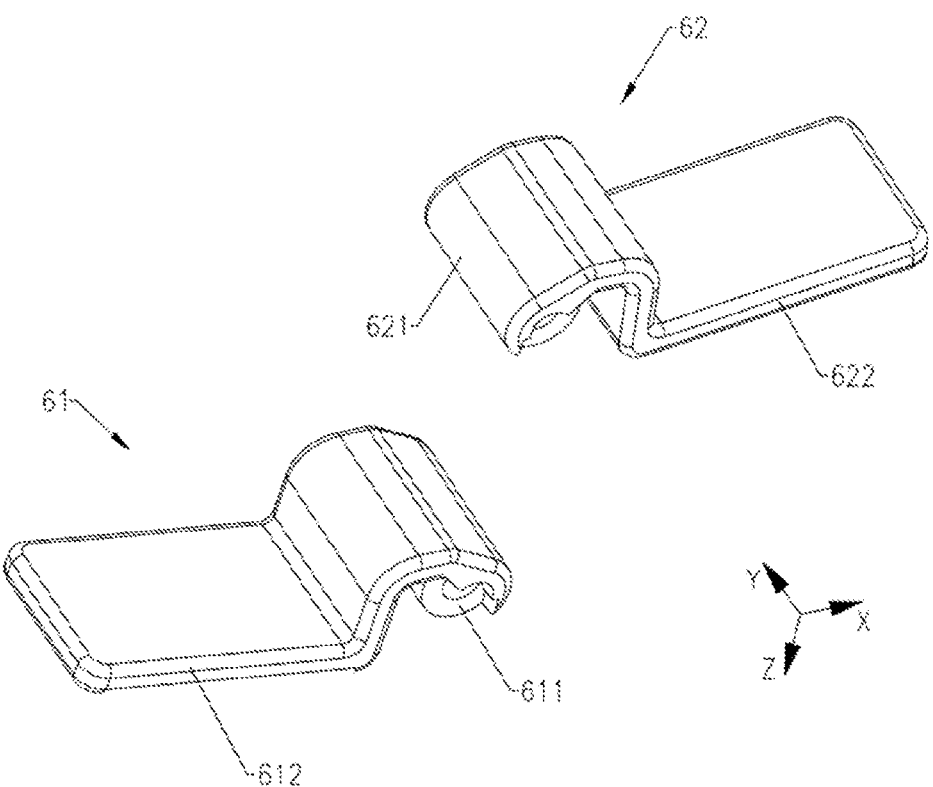
FIG. 14 is an enlarged schematic structural diagram of a first secondary swing arm and a second secondary swing arm in the rotating mechanism shown in FIG. 6.

FIG. 14 is a schematic structural diagram of a first secondary swing arm 61 and a second secondary swing arm 62 in the rotating mechanism 100 shown in FIG. 6.

The secondary swing arm 60 includes a first secondary swing arm 61 and a second secondary swing arm 62. A structure of the first secondary swing arm 61 is the same as that of the second secondary swing arm 62. The first secondary swing arm 61 includes a first secondary shaft seat 611 and a first secondary swing body 612. The first secondary swing body 612 is a plate structure. The first secondary shaft seat 611 is fixedly connected to the first secondary swing body 612, and the extension direction of the axis center of the first secondary shaft seat 611 is parallel to the direction Y. In this embodiment, the first secondary swing body 612 and the first secondary shaft seat 611 are integrally formed. The first secondary swing arm 61 is rotatably connected to the fastening base 10 and slidably connected to the first fastening plate 21.

The second secondary swing arm 62 includes a second secondary shaft seat 621 and a second secondary swing body 622. The second secondary swing body 622 is a plate structure. The second secondary shaft seat 621 is fixedly connected to the second secondary swing body 622, and the extension direction of the axis center of the second secondary shaft seat 621 is parallel to the direction Y. In this embodiment, the second secondary swing body 622 and the second secondary shaft seat 621 are integrally formed. The second secondary swing arm 62 is rotatably connected to the fastening base 10 and slidably connected to the second fastening plate 22.

Figure 15:
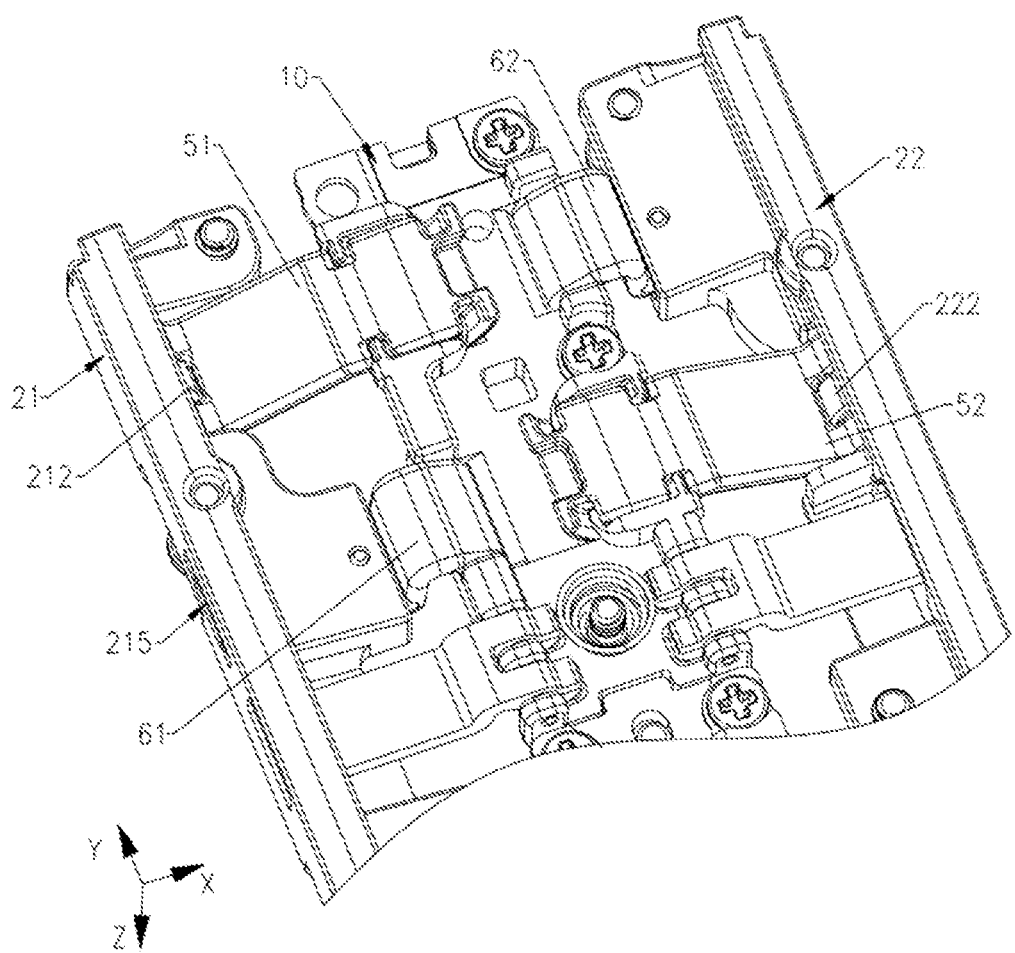
FIG. 15 is a partial schematic structural diagram of the rotating mechanism shown in FIG. 5.

Refer to FIG. 7 and FIG. 15. FIG. 15 is a partial schematic structural diagram of the rotating mechanism 100 shown in FIG. 5.

The first main swing arm 51 and the second main swing arm 52 are respectively located on two opposite sides of the fastening base 10 in the direction X, and are rotatably connected to the fastening base 10. In this embodiment, the first main swing arm 51 and the second main swing arm 52 are arranged in a nonaligned manner in the direction Y. In other embodiments, the first main swing arm 51 and the second main swing arm 52 may alternatively be arranged side by side along the direction X.

An end of the first main swing arm 51 away from the first shaft seat 513 extends into the fastening base 10, the first rotating body 511 is mounted in the first rotating slot 151, the first rotating surface 5111 and the bottom wall of the first rotating slot 151 are opposite to each other, the first slide rail 101 is located in the first arc-shaped slot 515, and the second slide rail 102 is located in the second arc-shaped slot 516. The first rotating shaft 514 is mounted in the first sleeve 212 of the first fastening plate 21, and the first rotating shaft 514 can rotate in the first sleeve 212. An end of the second main swing arm 52 away from the second shaft seat 523 extends into the fastening base 10, the second rotating body 521 is mounted in the second rotating slot 152, the second rotating surface 5211 and the bottom wall of the second rotating slot 152 are opposite to each other, the third slide rail 103 is located in the third arc-shaped slot 525, and the fourth slide rail 104 is located in the fourth arc-shaped slot 526. The second rotating shaft 524 is mounted in the second sleeve 222 of the second fastening plate 22, and the second rotating shaft 524 can rotate in the second sleeve 222.

The first secondary swing arm 61 and the second secondary swing arm 62 are respectively located on two opposite sides of the fastening base 10 in the direction X, and are rotatably connected to the fastening base 10. In this embodiment, the first secondary swing arm 61 and the second secondary swing arm 62 are arranged in a nonaligned manner in the direction Y. The first secondary shaft seat 611 is mounted on the first rotating shaft 105. The first secondary swing arm 61 and the first main swing arm 51 are spaced apart along the direction Y, and the first secondary swing arm 61 is located in the negative direction of the Y axis of the first main swing arm 51. An end of the first secondary swing body 612 away from the first secondary shaft seat 611 extends into the first slide slot 215 and can slide in the first slide slot 215, so that the first secondary swing arm 61 and the first fastening plate 21 are slidably connected to each other. The second secondary shaft seat 621 is mounted on the second rotating shaft 106. The second secondary swing arm 62 and the second main swing arm 52 are spaced apart along the direction Y, and the second secondary swing arm 62 is located in the positive direction of the Y axis of the second main swing arm 52. An end of the second secondary swing body 622 away from the second secondary shaft seat 621 extends into the third slide slot 225 and can slide in the third slide slot 225, so that the second secondary swing arm 62 and the second fastening plate 22 are slidably connected to each other.

When the rotating mechanism 100 is in the unfolded state, the first fastening plate 21 and the second fastening plate 22 are unfolded relative to the fastening base 10, the first main swing arm 51 and the second main swing arm 52 are unfolded relative to the fastening base 10, the first support surface 5112 and the second support surface 5212 are substantially on a same plane as the outer surface of the floating plate 1, and the first support surface 5112, the floating plate 1, and the second support surface 5212 jointly support the display screen 300. The first secondary swing arm 61 and the second secondary swing arm 62 are unfolded relative to the fastening base 10.

The first fastening plate 21 and the second fastening plate 22 rotate towards each other, and the first fastening plate 21 drives the first main swing arm 51 and the first secondary swing arm 61 to simultaneously rotate clockwise $\omega_2$. The first rotating body 511 rotates clockwise $\omega_2$ in the first rotating slot 151, the first arc-shaped slot 515 slides clockwise $\omega_2$ along the first slide rail 101, and the second arc-shaped slot 516 slides clockwise $\omega_2$ along the second slide rail 102. The first secondary shaft seat 611 rotates clockwise $\omega_2$, and at the same time, the first secondary swing body 612 slides in the first slide slot 215. The second fastening plate 22 drives the second main swing arm 52 and the second secondary swing arm 62 to simultaneously rotate counterclockwise $\omega_1$, the second rotating body 521 rotates counterclockwise $\omega_1$ in the second rotating slot 152, the third arc-shaped slot 525 slides counterclockwise $\omega_1$ along the third slide rail 103, and the fourth arc-shaped slot 526 slides counterclockwise $\omega_1$ along the fourth slide rail 104. The second secondary shaft seat 621 rotates counterclockwise $\omega_1$, and at the same time, the second secondary swinging body 622 slides in the third slide slot 225, so that the rotating mechanism 100 is in a folded state.

The first fastening plate 21 and the second fastening plate 22 rotate away from each other, and the first fastening plate 21 drives the first main swing arm 51 and the first secondary swing arm 61 to simultaneously rotate counterclockwise $\omega_1$. The first rotating body 511 rotates counterclockwise $\omega_1$ in the first rotating slot 151, the first arc-shaped slot 515 slides counterclockwise $\omega_1$ along the first slide rail 101, and the second arc-shaped slot 516 slides counterclockwise $\omega_1$ along the second slide rail 102. The first secondary shaft seat 611 rotates counterclockwise $\omega_1$, and at the same time, the first secondary swing body 612 slides in the first slide slot 215. The second fastening plate 22 drives the second main swing arm 52 to rotate clockwise $\omega_2$, the second rotating body 521 rotates clockwise $\omega_2$ in the second rotating slot 152, and the third arc-shaped slot 525 slides clockwise $\omega_2$ along the third slide rail 103, and the fourth arc-shaped slot 526 slides clockwise $\omega_2$ along the fourth slide rail 104. The second secondary shaft seat 621 rotates clockwise $\omega_2$, and at the same time, the second secondary swinging body 622 slides in the third slide slot 225, so that the rotating mechanism 100 returns to the unfolded state.

In this embodiment, the first main swing arm 51 and the second main swing arm 52 are disposed, so that the first fastening plate 21 and the second fastening plate 22 rotate relative to the fastening base 10. The first secondary swing arm 61 is disposed, and the first secondary swing arm 61 and the first main swing arm 51 jointly drive the first fastening plate 21 to rotate relative to the fastening base 10, so that the stability of the rotation of the first fastening plate 21 can be improved. The second secondary swing arm 62 is disposed, and the second secondary swing arm 62 and the second main swing arm 52 jointly drive the second fastening plate 22 to rotate relative to the fastening base 10, so that the stability of the rotation of the second fastening plate 22 can be improved.

Also referring to FIG. 6, the main swing arm 50 further includes a third main swing arm 53 and a fourth main swing arm 54, and structures of the third main swing arm 53 and the fourth main swing arm 54 are the same as those of the first main swing arm 51 and the second main swing arm 52. The third main swing arm 53 is symmetrical to the second main swing arm 52 about the central axis O, and the fourth main swing arm 54 is symmetrical to the first main swing arm 51 about the central axis O. Both the third main swing arm 53 and the fourth main swing arm 54 are mounted on the fastening base 10, and the third main swing arm 53 and the fourth main swing arm 54 can rotate relative to the fastening base 10. The third main swing arm 53 is rotatably connected to the third fastening plate 23, and when the third fastening plate 23 rotates, the third main swing arm 53 is driven to rotate relative to the fastening base 10. The fourth main swing arm 54 is rotatably connected to the fourth fastening plate 24, and when the fourth fastening plate 24 rotates, the fourth main swing arm 54 is driven to rotate relative to the fastening base 10.

The secondary swing arm 60 further includes a third secondary swing arm 63 and a fourth secondary swing arm 64. The third secondary swing arm 63 and the fourth secondary swing arm 64 have same structures as those of the first secondary swing arm 61 and the second secondary swing arm 62. The third secondary swing arm 63 is symmetrical to the second secondary swing arm 62 about the central axis O, and the fourth secondary swing arm 64 is symmetrical to the first secondary swing arm 61 about the central axis O. Both the third secondary swing arm 63 and the fourth secondary swing arm 64 are mounted on the fastening base 10, and the third secondary swing arm 63 is slidably connected to the third fastening plate 23, and the fourth secondary swing arm 64 is slidably connected to the fourth fastening plate 24.

Figure 16:
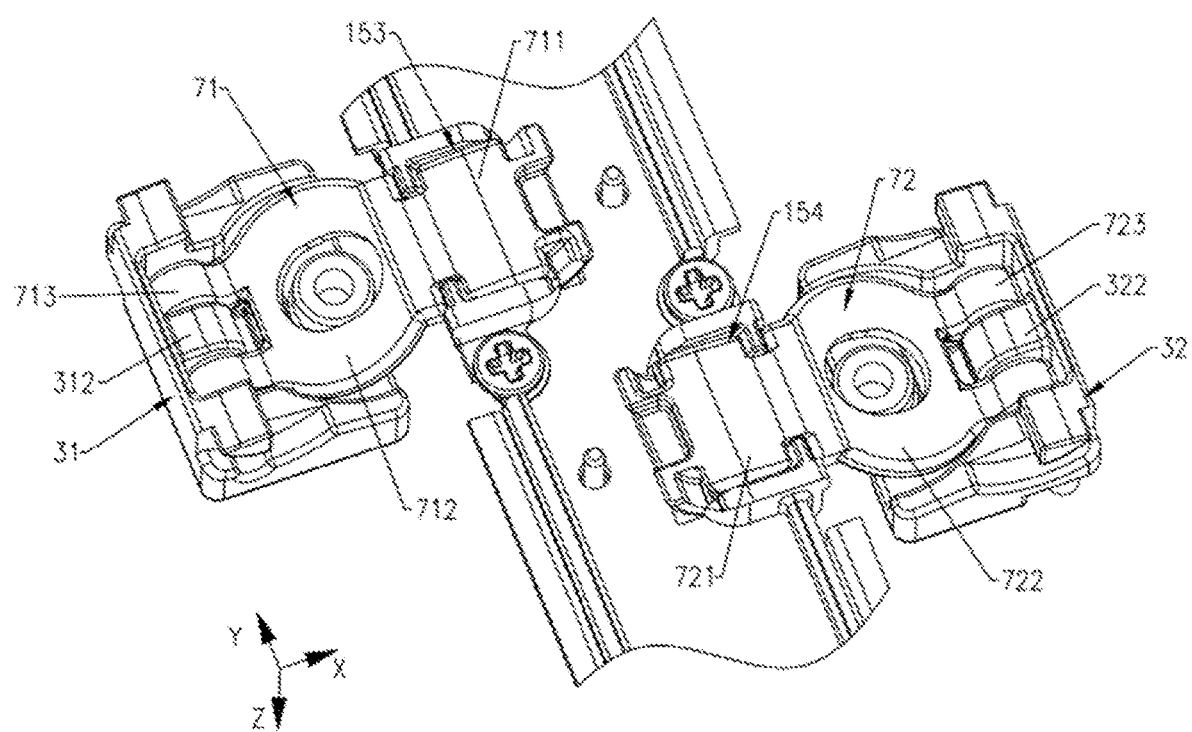
FIG. 16 is a partial schematic structural diagram of the rotating mechanism shown in FIG. 5.

FIG. 16 is a partial schematic structural diagram of the rotating mechanism 100 shown in FIG. 5.

The auxiliary swing arm 70 includes a first auxiliary swing arm 71 and a second auxiliary swing arm 72. The first auxiliary swing arm 71 includes a first auxiliary rotating body 711, a first auxiliary swing body 712, and a first auxiliary rotating shaft 713. The first auxiliary rotating body 711 is arc-shaped, and the shape of the first auxiliary rotating body 711 matches the shape of the first auxiliary rotating slot 153. The first auxiliary swing body 712 is a flat plate structure. The first auxiliary swing body 712 is fixedly connected to the first auxiliary rotating body 711. The first auxiliary rotating shaft 713 is fixedly connected to an end of the first auxiliary swing body 712 away from the first auxiliary rotating body 711, and the extension direction of the axis center of the first auxiliary rotating shaft 713 is parallel to the direction Y.

The structure of the second auxiliary swing arm 72 is the same as that of the first auxiliary swing arm 71. The second auxiliary swing arm 72 includes a second auxiliary rotating body 721, a second auxiliary swing body 722, and a second auxiliary rotating shaft 723. The second auxiliary rotating body 721 is arc-shaped, and the shape of the second auxiliary rotating body 721 matches the shape of the second auxiliary rotating slot 154. The second auxiliary swing body 722 is a flat plate structure. The second auxiliary swing body 722 is fixedly connected to the second auxiliary rotating body 721. The second auxiliary rotating shaft 723 is fixedly connected to an end of the second auxiliary swing body 722 away from the second auxiliary rotating body 721, and the extension direction of the axis center of the second auxiliary rotating shaft 723 is parallel to the direction Y.

The first auxiliary swing arm 71 and the second auxiliary swing arm 72 are respectively located on two opposite sides of the fastening base 10 in the direction X, and are rotatably connected to the fastening base 10. In this embodiment, the first auxiliary swing arm 71 and the second auxiliary swing arm 72 are disposed in a nonaligned manner in the direction Y, and the first auxiliary swing arm 71 and the second auxiliary swing arm 72 are centrally symmetrical. In other embodiments, the first auxiliary swing arm 71 and the second auxiliary swing arm 72 may alternatively be arranged side by side along the direction X. The first auxiliary rotating body 711 is located in the first auxiliary rotating slot 153, and the first auxiliary rotating body 711 can rotate in the first auxiliary rotating slot 153. The first auxiliary rotating shaft 713 is located in the first auxiliary sleeve 312 of the first auxiliary fastening plate 31 and is rotatably connected to the first auxiliary sleeve 312. The second auxiliary rotating body 721 is located in the second auxiliary rotating slot 154, and the second auxiliary rotating body 721 can rotate in the second auxiliary rotating slot 154. The second auxiliary rotating shaft 723 is located in the second auxiliary sleeve 322 of the second auxiliary fastening plate 32 and is rotatably connected to the second auxiliary sleeve 322.

When the rotating mechanism 100 is in the unfolded state, the first auxiliary fastening plate 31 and the second auxiliary fastening plate 32 are unfolded relative to the fastening base 10. The first auxiliary swing arm 71 and the second auxiliary swing arm 72 are unfolded relative to the fastening base 10. The first auxiliary fastening plate 31 and the second auxiliary fastening plate 32 rotate towards each other, the first auxiliary fastening plate 31 rotates clockwise $\omega_2$, and the first auxiliary rotating shaft 713 drives the first auxiliary swing body 712 to rotate clockwise $\omega_2$, thereby driving the first auxiliary rotating body 711 to rotate clockwise $\omega_2$ in the first auxiliary rotating slot 153. The second auxiliary fastening plate 32 rotates counterclockwise $\omega_1$, and the second auxiliary rotating shaft 723 drives the second auxiliary swing body 722 to rotate counterclockwise $\omega_1$, thereby driving the second auxiliary rotating body 721 to rotate counterclockwise $\omega_1$ in the second auxiliary rotating slot 154, so that the first auxiliary fastening plate 31 and the second auxiliary fastening plate 32 are folded relative to each other, and the rotating mechanism 100 rotates to the folded state.

The first auxiliary fastening plate 31 and the second auxiliary fastening plate 32 rotate away from each other, the first auxiliary fastening plate 31 rotates counterclockwise $\omega_1$, and the first auxiliary rotating shaft 713 drives the first auxiliary swinging body 712 to rotate counterclockwise ox, thereby driving the first auxiliary rotating body 711 to rotate counterclockwise $\omega_1$ in the first auxiliary rotating slot 153. The second auxiliary fastening plate 32 rotates clockwise $\omega_2$, and the second auxiliary rotating shaft 723 drives the second auxiliary swing body 722 to rotate clockwise $\omega_2$, thereby driving the second auxiliary rotating body 721 to rotate clockwise $\omega_2$ in the second auxiliary rotating slot 154, so that the first auxiliary fastening plate 31 and the second auxiliary fastening plate 32 are unfolded relative to each other, and the rotating mechanism 100 rotates to the unfolded state.

In this embodiment, the first auxiliary fastening plate 31 is fixedly connected to the first casing 210, and the second auxiliary fastening plate 32 is fixedly connected to the second casing 220. When the first casing 210 rotates relative to the fastening base 10, the first auxiliary fastening plate 31 and the first fastening plate 21 are driven to rotate simultaneously, to drive the first auxiliary swing arm 71, the first main swing arm 51, and the first secondary swing arm 61 to rotate simultaneously, thereby improving the stability of the connection between the first casing 210 and the rotating mechanism 100 and improving the stability of the rotation of the first casing 210. When the second casing 220 rotates relative to the fastening base 10, the second auxiliary fastening plate 32 and the second fastening plate 22 are driven to rotate, to drive the second auxiliary swing arm 72, the second main swing arm 52, and the second secondary swing arm 62 to rotate simultaneously, thereby improving the stability of the connection between the second casing 220 and the rotating mechanism 100 and improving the stability of the rotation of the second casing 220, so as to further improve the rotation stability of the rotating mechanism 100 and the foldable electronic device 500.

Figure 17:
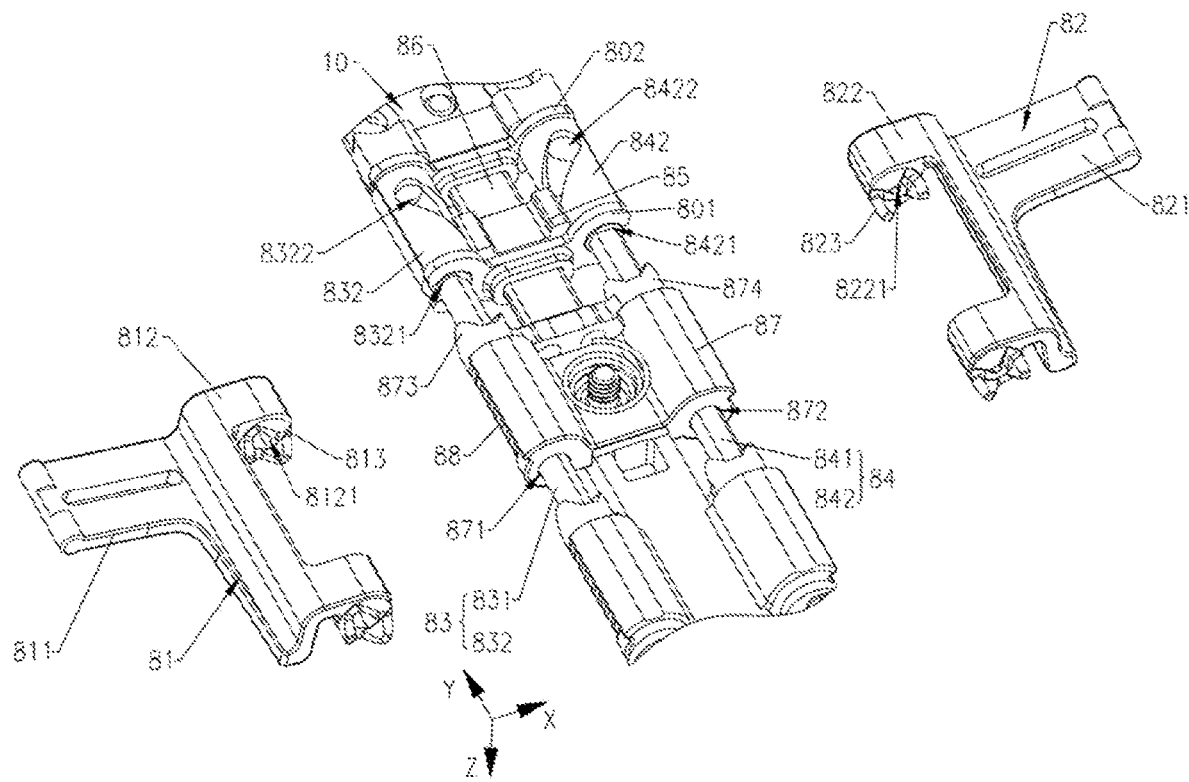
FIG. 17 is a partial schematic structural exploded view of the rotating mechanism shown in FIG. 5.

FIG. 17 is a partial schematic structural exploded view of the rotating mechanism 100 shown in FIG. 5.

The synchronous component 80 includes a first synchronous swing arm 81, a second synchronous swing arm 82, a first rotating rod 83, a second rotating rod 84, a slider 85, a slide plate 86, a fastening block 87, and a second elastic member 88. The fastening block 87 is provided with a first shaft hole 871 and a second shaft hole 872. The first shaft hole 871 and the second shaft hole 872 are spaced apart and arranged in parallel, and both the first shaft hole 871 and the second shaft hole 872 run through the fastening block 87 in directions of axis centers of the first shaft hole and the second shaft hole. The fastening block 87 is mounted on the fastening base 10 and fixedly connected to the fastening base 10, and the extension directions of the first shaft hole 871 and the second shaft hole 872 are parallel to the direction Y.

The first rotating rod 83 includes a first rotating sub-rod 831 and a first rotating column 832. The first rotating sub-rod 831 is a strip-shaped rod structure. The first rotating sub-rod 831 includes a first flat shaft section and a first circular shaft section (not shown in the figure). An outer peripheral surface of the first flat shaft section includes a first flat surface portion and a first cambered surface portion (not shown in the figure). The outer peripheral surface is a surface around the axis. It can be understood that a cross section of the first flat shaft section perpendicular to the axis has arc edges and straight edges. The first flat surface section is connected to the first cambered surface section to form the outer peripheral surface of the first flat shaft section. The first circular shaft section is cylindrical, and an outer peripheral surface of the first circular shaft section is circular.

The first rotating column 832 is a hollow cylindrical structure. A cross-sectional area of the first rotating column 832 is larger than that of the first rotating sub-rod 831. The first rotating column 832 is provided with a first mounting hole 8321 and a first helical slot 8322. The first helical slot 8322 is recessed on the outer peripheral surface of the first rotating column 832, and the first helical slot 8322 is helical and extends axially around the first rotating column 832. The first mounting hole 8321 is disposed in the first rotating column 832 and runs through the first rotating column 832 in the direction Y. A contour of the inner peripheral surface of the first mounting hole 8321 is consistent with that of the outer peripheral surface of the first flat shaft section of the first rotating sub-rod 831. The inner peripheral surface of the first mounting hole 8321 includes a flat surface portion and a cambered surface portion. The first rotating column 832 is mounted on the first flat shaft section of the first rotating sub-rod 831, and the first rotating sub-rod 831 is located in the first mounting hole 8321. The first flat surface portion of the first rotating sub-rod 831 is opposite to a flat surface portion of the inner peripheral surface of the first mounting hole 8321, and a first cambered surface portion of the first rotating sub-rod 831 is opposite to a cambered surface portion of the inner peripheral surface of the first mounting hole 8321. The first rotating sub-rod 831 is mounted in the first shaft hole 871. The first circular shaft section of the first rotating sub-rod 831 is located in the first shaft hole 871, and the first rotating sub-rod 831 can rotate in the first shaft hole 871 to drive the first rotating rod 83 to rotate. In this embodiment, the first flat shaft section is disposed on the first rotating sub-rod 831, so that the first rotating column 832 can be fixedly connected to the first rotating sub-rod 831. When the first rotating sub-rod 831 rotates, the first rotating column 832 can be driven to rotate synchronously with the first rotating sub-rod 831. Moreover, the first circular shaft section is disposed on the first rotating sub-rod 831, so that the first rotating rod 83 can be rotatably connected to the fastening block 87. Moreover, the first helical slot 8322 is provided on the first rotating column 832 with a larger cross-sectional area, which can improve the stability of the connection between the slider 85 and the first rotating rod 83. In addition, the first rotating rod 83 is a segmented structure, and structures of the first rotating sub-rod 831 and the first rotating column 832 can be changed according to different matching requirements, thereby saving the space and reducing the weight.

In an embodiment, the first rotating sub-rod 831 and the first rotating column 832 may alternatively be fixedly connected through welding, bonding, or other connection methods. Alternatively, the first rotating sub-rod 831 and the first rotating column 832 can also be integrally formed, as long as rotation of the first rotating sub-rod 831 can drive the first rotating column 832 to rotate synchronously.

The second rotating rod 84 includes a second rotating sub-rod 841 and a second rotating column 842. The second rotating sub-rod 841 is a strip-shaped rod structure. The second rotating sub-rod 841 includes a second flat shaft section and a second circular shaft section (not shown in the figure). An outer peripheral surface of the second flat shaft section includes a second flat surface portion and a second cambered surface portion (not shown in the figure). The second flat surface section is connected to the second cambered surface section to form the outer peripheral surface of the second flat shaft section. The second circular shaft section is cylindrical, and an outer peripheral surface of the first circular shaft section is circular.

The structure of the second rotating column 842 is the same as that of the first rotating column 832, and the second rotating column 842 and the first rotating column 832 are arranged symmetrically. The second rotating column 842 is a hollow cylindrical structure. A cross-sectional area of the second rotating column 842 is larger than that of the second rotating sub-rod 841. The second rotating column 842 is provided with a second mounting hole 8421 and a second helical slot 8422. The second helical slot 8422 is recessed on the outer peripheral surface of the second rotating column 842, and the second helical slot 8422 is helical and extends axially around the second rotating column 842. The second mounting hole 8421 is disposed in the second rotating column 842 and runs through the second rotating column 842 in the direction Y. A contour of the inner peripheral surface of the second mounting hole 8421 is consistent with that of the outer peripheral surface of the second flat shaft section of the second rotating sub-rod 841. The inner peripheral surface of the second mounting hole 8421 includes a flat surface portion and a cambered surface portion. The second rotating column 842 is mounted on the second flat shaft section of the second rotating sub-rod 841, the second rotating sub-rod 841 is located in the second mounting hole 8421, and the second helical slot 8422 is opposite to the first helical slot 8322. The flat surface portion of the second rotating sub-rod 841 is opposite to a flat surface portion of the inner peripheral surface of the second mounting hole 8421, and a cambered surface portion of the second rotating sub-rod 841 is opposite to a cambered surface portion of the inner peripheral surface of the second mounting hole 8421. The second rotating sub-rod 841 is mounted in the second shaft hole 872. The second circular shaft section of the second rotating sub-rod 841 is located in the second shaft hole 872, and the second rotating sub-rod 841 can rotate in the second shaft hole 872 to drive the second rotating rod 84 to rotate. The extension directions of axis centers of the first rotating column 832, the second rotating column 842, the first rotating sub-rod 831, and the second rotating sub-rod 841 are all parallel to the direction Y.

In this embodiment, the second flat shaft section is disposed on the second rotating sub-rod 841, so that the second rotating column 842 can be fixedly connected to the second rotating sub-rod 841. When the second rotating sub-rod 841 rotates, the second rotating column 842 can be driven to rotate synchronously with the second rotating sub-rod 841. Moreover, the second circular shaft section is disposed on the second rotating sub-rod 841, so that the second rotating rod 84 can be rotatably connected to the fastening block 87. Moreover, the second helical slot 8422 is provided on the second rotating column 842 with a larger cross-sectional area, which can improve the stability of the connection between the slider 85 and the second rotating rod 84. In addition, the second rotating rod 84 is a segmented structure, and structures of the second rotating sub-rod 841 and the second rotating column 842 can be changed according to different matching requirements, thereby saving the space and reducing the weight.

In an embodiment, the second rotating sub-rod 841 and the second rotating column 842 may alternatively be fixedly connected through welding, bonding, or other connection methods. Alternatively, the second rotating sub-rod 841 and the second rotating column 842 can also be integrally formed, as long as rotation of the second rotating sub-rod 841 can drive the second rotating column 842 to rotate synchronously. The slide plate 86 is a strip-shaped plate structure. The slide plate 86 is mounted on the fastening base 10 and located between the first rotating column 832 and the second rotating column 842, and the length direction of the slide plate 86 is parallel to the direction Y.

Figure 18:
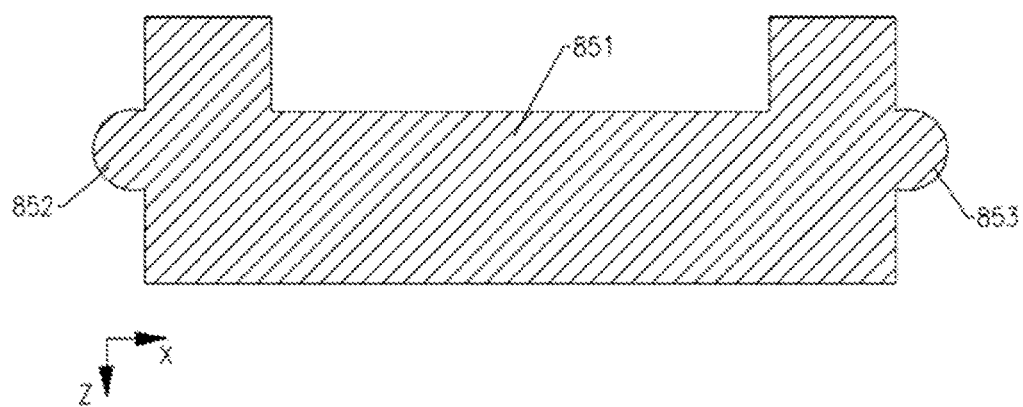
FIG. 18 is a sectional view of a slider shown in FIG. 17.

FIG. 18 is a sectional view of the slider 85 shown in FIG. 17.

The slider 85 includes a slide body 851, a first protrusion 852, and a second protrusion 853. The first protrusion 852 and the second protrusion 853 are respectively located on two opposite sides of the slide body 851 in the direction X, and protrude from the surface of the slide body 851, and the first protrusion 852 and the second protrusion 853 are arranged symmetrically. The slider 85 is mounted on the slide plate 86, the first protrusion 852 is located in the first helical slot 8322, the second protrusion 853 is located in the second helical slot 8422, and the slider 85 can slide along the slide plate 86 in the direction Y. In this embodiment, a slide slot is provided on a side of the slider 85 facing the slide plate 86, and an extension direction of the slide slot is parallel to the direction Y. The slider 85 is mounted on the slide plate 86 through the slide slot, so as to implement the slidable connection between the slider 85 and the slide plate 86.

In this embodiment, the synchronous component 80 further includes a first baffle 801 and a second baffle 802. Both the first baffle 801 and the second baffle 802 are plate structures. Both the first baffle 801 and the second baffle 802 are mounted on the slide plate 86 and are fixedly connected to the slide plate 86, and the first baffle 801 and the second baffle 802 are respectively located at two opposite ends of the first rotating column 832 in the direction Y. The first baffle 801 and the second baffle 802 are used to block the slider 85 to prevent the slider 85 from detaching from the first rotating column 832 or the second rotating column 842.

Figure 19:
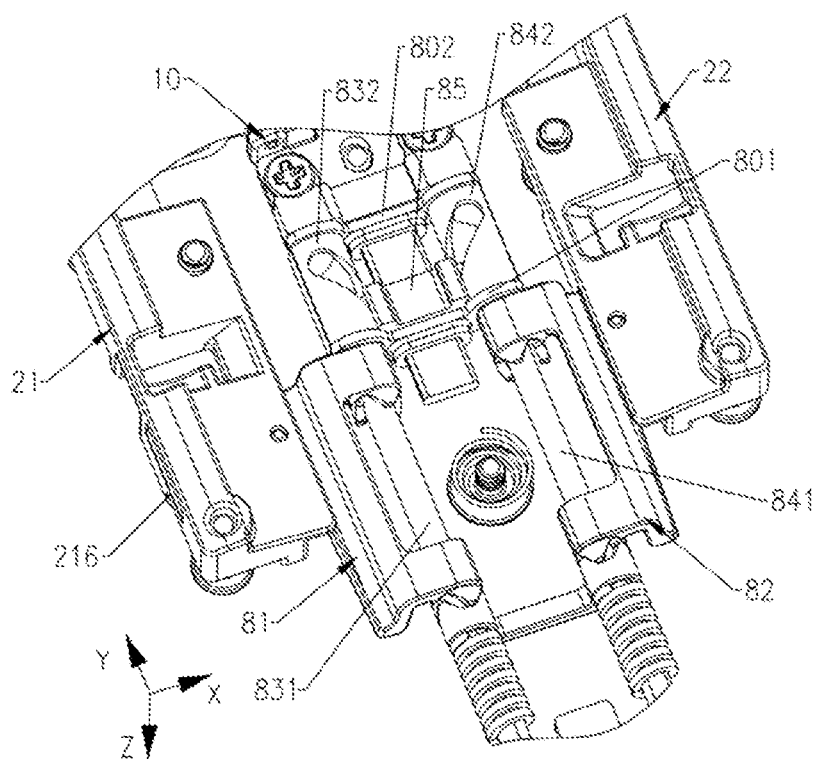
FIG. 19 is a partial schematic structural diagram of the rotating mechanism shown in FIG. 5.
Figure 20:
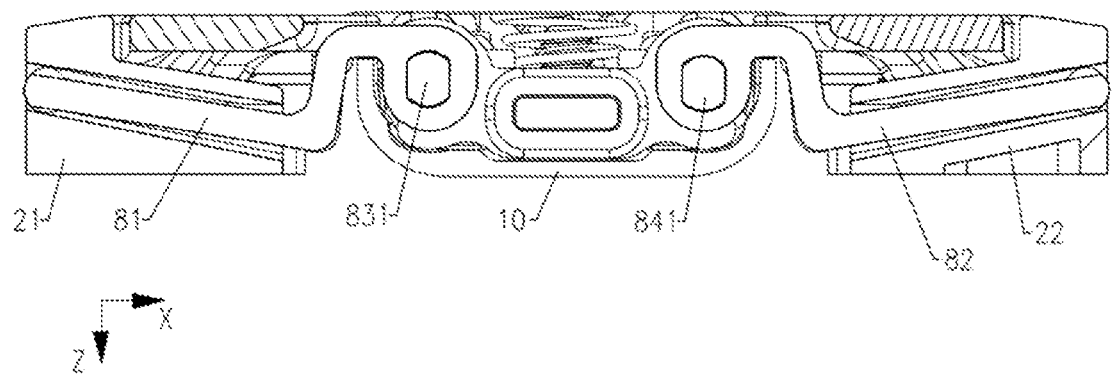
FIG. 20 is a sectional view of the rotating mechanism shown in FIG. 18.

FIG. 19 is a partial schematic structural diagram of the rotating mechanism 100 shown in FIG. 5. FIG. 20 is a sectional view of the rotating mechanism 100 shown in FIG. 18.

The first synchronous swing arm 81 includes a first synchronous swing body 811 and a first synchronous shaft seat 812. The first synchronous shaft seat 812 is fixedly connected to the first synchronous swing body 811. The first synchronous shaft seat 812 is provided with a first rotating hole 8121, the extension direction of the first rotating hole 8121 is parallel to the direction Y, and the contour of the inner wall of the first rotating hole 8121 is consistent with the outer contour of the first flat shaft section. The first synchronous shaft seat 812 is mounted on the first flat shaft section of the first rotating sub-rod 831 and spaced apart from the first rotating column 832, and the first synchronous swing arm 81 is fixedly connected to the first rotating sub-rod 831. An end of the first synchronous swing body 811 away from the first synchronous shaft seat 812 extends into the second slide slot 216 and can slide in the second slide slot 216.

The second synchronous swing arm 82 includes a second synchronous swing body 821 and a second synchronous shaft seat 822. The second synchronous shaft seat 822 is fixedly connected to the second synchronous swing body 821. The second synchronous shaft seat 822 is provided with a second rotating hole 8221, an extension direction of the second rotating hole 8221 is parallel to the direction Y, and a contour of an inner wall of the second rotating hole 8221 is consistent with the outer contour of the second flat shaft section. The second synchronous shaft seat 822 is mounted on the second flat shaft section of the second rotating sub-rod 841 and spaced apart from the second rotating column 842, so that the second synchronous swing arm 82 is fixedly connected to the second rotating sub-rod 841. An end of the second synchronous swing body 821 facing the second synchronous shaft seat 822 extends into the fourth slide slot 226 and can slide in the fourth slide slot 226.

In an implementation, the fastening block 87 includes a first hinged body 873, and the second elastic member 88 is mounted in the fastening block 87 and fixedly connected to the first hinged body 873. The first synchronous swing arm 81 includes a second hinged body 813, and the second hinged body 813 is fixedly connected to the first synchronous shaft seat 812 and located on the outer periphery of the opening of the first rotating hole 8121. The first synchronous swing arm 81 is mounted on the first rotating sub-rod 831, and the first hinged body 873 is hinged to the second hinged body 813. The rotation of the first synchronous swing arm 81 can drive the first rotating rod 83 to rotate, and the first hinged body 873 and the second hinged body 813 repeatedly squeeze the second elastic member 88, so that the second elastic member 88 is switched between the expanded state and the compressed state. Specifically, the first hinged body 873 and the second hinged body 813 may be concave and convex wheels that cooperate with each other. In this embodiment, the first hinged body 873 is disposed on the fastening block 87 and the second hinged body 813 is provided on the first synchronous swing arm 81, and when the first synchronous swing arm 81 rotates, the second hinged body 813 rotates relative to the first hinged body 873, to provide damping feel for the rotating mechanism 100 and improve user experience.

The synchronous component 80 further includes a third elastic member (not shown in the figure). The fastening block 87 further includes a third hinged body 874, and the third elastic member is mounted in the fastening block 87 and fixedly connected to the third hinged body 874. The second synchronous swing arm 82 includes a fourth hinged body 823, and the fourth hinged body 823 is fixedly connected to the second synchronous shaft seat 822 and located on the outer periphery of the opening of the second rotating hole 8221. The second synchronous swing arm 82 is mounted on the second rotating sub-rod 841, and the third hinged body 874 is hinged to the fourth hinged body 823. The rotation of the second synchronous swing arm 82 can drive the second rotating rod 84 to rotate, and the third hinged body 874 and the fourth hinged body 823 repeatedly squeeze the third elastic member, so that the third elastic member is switched between the expanded state and the compressed state. Specifically, the third hinged body 874 and the fourth hinged body 823 may be concave and convex wheels that cooperate with each other. In this embodiment, the third hinged body 874 is disposed on the fastening block 87 and the fourth hinged body 823 is provided on the second synchronous swing arm 82, and when the second synchronous swing arm 82 rotates, the fourth hinged body 823 rotates relative to the third hinged body 874, to provide damping feel for the rotating mechanism 100 and improve user experience.

Still referring to FIG. 17 to FIG. 20, when the rotating mechanism 100 is in the unfolded state, the first fastening plate 21 and the second fastening plate 22 are unfolded relative to the fastening base 10, the first synchronous swing arm 81 and the second synchronous swing arm 82 are unfolded relative to the fastening base 10, and the slider 85 is located at an end near the first baffle 80. When the first fastening plate 21 rotates clockwise $\omega_2$, the first synchronous swing arm 81 is driven to rotate clockwise $\omega_2$, and the first synchronous swing arm 81 is driven to slide in the second slide slot 216. The first synchronous swing arm 81 rotates clockwise $\omega_2$ to drive the first rotating sub-rod 831 to rotate clockwise $\omega_2$, and drive the first rotating column 832 to rotate clockwise $\omega_2$, thereby driving the first helical slot 8322 to rotate. The first helical slot 8322 is helical and drives the first protrusion 852 to move relative to the first helical slot 8322 along the axial direction of the first rotating column 832, and the first protrusion 852 drives the slide body 851 to slide along the slide plate 86 towards the second baffle 802. At the same time, when the slide body 851 slides towards the second baffle 802, the second protrusion 853 is driven to move relative to the second helical slot 8422 along the axial direction of the second rotating column 842, and the second rotating column 842 is caused to rotate counterclockwise $\omega_1$, to drive the second rotating sub-rod 841 to rotate counterclockwise $\omega_1$, thereby driving the second synchronous swing arm 82 fixedly connected to the second rotating sub-rod 841 to rotate counterclockwise $\omega_1$, and then driving the second fastening plate 22 to rotate counterclockwise $\omega_1$, so that the rotating mechanism 100 rotates to the folded state, so as to implement the synchronous rotation of the rotating mechanism 100.

When the rotating mechanism 100 is in the folded state, the first fastening plate 21 and the second fastening plate 22 are folded relative to the fastening base 10, the first synchronous swing arm 81 and the second synchronous swing arm 82 are folded relative to the fastening base 10, and the slider 85 is located at an end near the second baffle 802. When the first fastening plate 21 rotates counterclockwise $\omega_1$, the first synchronous swing arm 81 is driven to rotate counterclockwise $\omega_1$, and the first synchronous swing body 811 is driven to slide in the second slide slot 216. The first synchronous swing arm 81 rotates counterclockwise $\omega_1$ to drive the first rotating sub-rod 831 to rotate counterclockwise $\omega_1$, and drive the first rotating column 832 to rotate counterclockwise $\omega_1$, thereby driving the first helical slot 8322 to rotate. The first helical slot 8322 is helical and drives the first protrusion 852 to move relative to the first helical slot 8322 along the axial direction of the first rotating column 832, and the first protrusion 852 drives the slide body 851 to slide along the slide plate 86 towards the first baffle 801. At the same time, when the slide body 851 slides towards the first baffle 801, the second protrusion 853 is driven to move relative to the second helical slot 8422 along the axial direction of the second rotating column 842, and the second rotating column 842 is caused to rotate clockwise $\omega_2$, to drive the second rotating sub-rod 841 to rotate clockwise $\omega_2$, thereby driving the second synchronous swing arm 82 fixedly connected to the second rotating sub-rod 841 to rotate clockwise $\omega_2$, and then driving the second fastening plate 22 to rotate clockwise $\omega_2$, so that the rotating mechanism 100 returns to the unfolded state.

In this embodiment, the synchronous component 80 is disposed, so that the first fastening plate 21 and the second fastening plate 22 can synchronously rotate. Besides, the slider 85 is provided between the first rotating rod 83 and the second rotating rod 84, and the first rotating rod 83 and the second rotating rod 84 are driven to synchronously rotate through the sliding of the slider 85, to drive the first synchronous swing arm 81 and the second synchronous swing arm 82 to synchronously rotate. In the synchronous component 80 provided in this embodiment, the rotating mechanism 100 can implement synchronous rotation without synchronous gears, which can simplify the structure of the synchronous component 80, thereby reducing the thickness of the rotating mechanism 100 in the folded state and facilitating thinning of the foldable electronic device 500. Moreover, the first helical slot 8322 and the second helical slot 8422 are provided, and the slider 85 slides in the first helical slot 8322 and the second helical slot 8422, so that the first rotating rod 83 and the second rotating rod 84 synchronously rotate, thereby implementing synchronous rotation of the first synchronous swing arm 81 and the second synchronous swing arm 82. This can further simplify the structure of the synchronous component 80 and implement thinning of the foldable electronic device 500.

Figure 21:
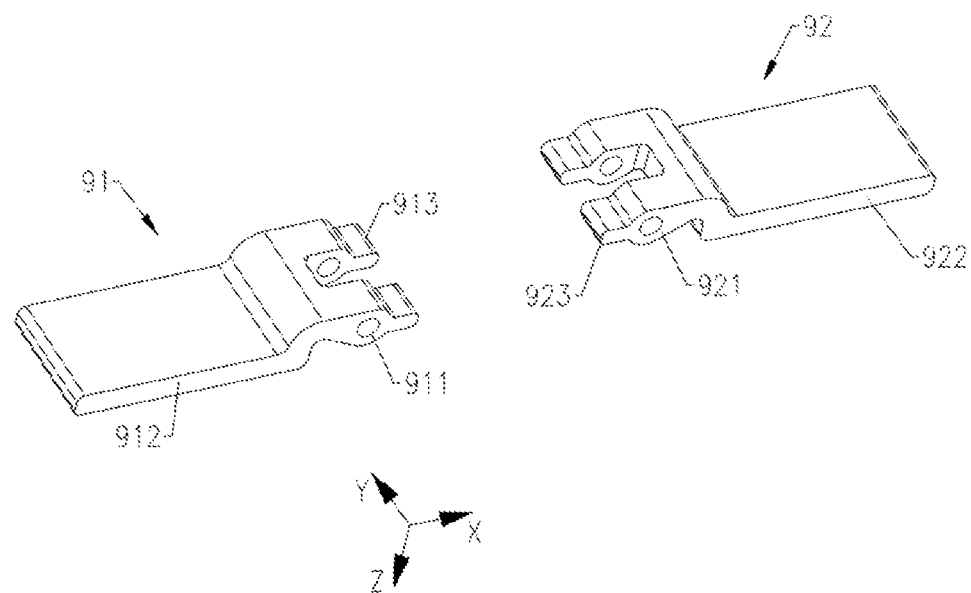
FIG. 21 is a schematic structural diagram of a first pressing plate swing arm and a second pressing plate swing arm in the rotating mechanism shown in FIG. 6.

FIG. 21 is a schematic structural diagram of a first pressing plate swing arm 91 and a second pressing plate swing arm 92 in the rotating mechanism 100 shown in FIG. 6.

The pressing plate swing arm 90 includes a first pressing plate swing arm 91 and a second pressing plate swing arm 92. In this embodiment, there are four first pressing plate swing arms 91. In other embodiments, a number of first pressing plate swing arms 91 may alternatively be two, three, five, or more than five, as long as the number of first pressing plate swing arms 91 is the same as that of first pressing plate slide slots 4113. Each first pressing plate swing arm 91 includes a first pressing plate shaft seat 911 and a first pressing plate swing body 912, and the first pressing plate shaft seat 911 is fixedly connected to the first pressing plate swing body 912. The extension direction of the axis center of the first pressing plate shaft seat 911 is parallel to the direction Y. The first pressing plate swing arm 91 further includes a first abutting end 913, and the first abutting end 913 is located at an end of the first pressing plate swing arm 91 away from the first pressing plate swing body 912.

A structure of the second pressing plate swing arm 92 is the same as that of the first pressing plate swing arm 91. There are four second pressing plate swing arms 92. In other embodiments, a number of second pressing plate swing arms 92 may alternatively be two, three, five, or more than five, as long as the number of second pressing plate swing arms 92 is the same as that of second pressing plate slide slots 4213. The second pressing plate swing arm 92 includes a second pressing plate shaft seat 921 and a second pressing plate swing body 922, and the second pressing plate shaft seat 921 is fixedly connected to the second pressing plate swing body 922. The extension direction of the axis center of the second pressing plate shaft seat 921 is parallel to the direction Y. The second pressing plate swing arm 92 further includes a second abutting end 923, and the second abutting end 923 is located at an end of the second pressing plate swing arm 92 away from the second pressing plate swing body 922.

Referring to FIG. 6, the first pressing plate swing arm 91 and the second pressing plate swing arm 92 are respectively located on two opposite sides of the fastening base 10 in the direction X, and the first pressing plate swing arm 91 and the second pressing plate swing arm 92 are symmetrically disposed. The four first pressing plate swing arms 91 are arranged at intervals along the direction Y, each first pressing plate shaft seat 911 is rotatably connected to the fastening base 10, and the first pressing plate shaft seat 911 can rotate around the fastening base 10. In this embodiment, the fastening base 10 is provided with a rotating shaft, and the first pressing plate shaft seat 911 is sleeved on the rotating shaft, so that the first pressing plate swing arm 91 and the fastening base 10 are rotatably connected to each other. An end of the first pressing plate swing body 912 away from the first pressing plate shaft seat 911 is mounted in a first pressing plate slide slot 4113, and each first pressing plate swing body 912 can slide in the corresponding first pressing plate slide slot 4113.

The four second pressing plate swing arms 92 are arranged at intervals along the direction Y, the second pressing plate shaft seat 921 of each second pressing plate swing arm 92 is rotatably connected to the fastening base 10, and the second pressing plate shaft seat 921 can rotate around the fastening base 10. In this embodiment, the fastening base 10 is provided with a rotating shaft, and the second pressing plate shaft seat 921 is sleeved on the rotating shaft, so that the second pressing plate swing arm 92 and the fastening base 10 are rotatably connected to each other. An end of the second pressing plate swing body 922 away from the second pressing plate shaft seat 921 is mounted in a second pressing plate slide slot 4213, and each second pressing plate swing body 922 can slide in the corresponding second pressing plate slide slot 4213.

When the rotating mechanism 100 is in the unfolded state, the first pressing plate 41 and the second pressing plate 42 are unfolded relative to the fastening base 10, and the first pressing plate swing arm 91 and the second pressing plate swing arm 92 are unfolded relative to the fastening base 10. The first abutting end 913 of the first pressing plate swing arm 91 and the second abutting end 923 of the second pressing plate swing arm 92 jointly abut against the floating plate 1 and pull the first elastic member 16 (as shown in FIG. 8), so that the first elastic member 16 is in a stretched state. The first pressing plate 41 and the second pressing plate 42 rotate towards each other, and the first pressing plate 41 drives the first pressing plate swing body 912 to rotate clockwise $\omega_2$, to drive the first pressing plate shaft seat 911 to rotate clockwise $\omega_2$, so that the first abutting end 913 releases the floating plate 1. The second pressing plate 42 drives the second pressing plate swing body 922 to rotate counterclockwise $\omega_1$, to drive the second pressing plate shaft seat 921 to rotate counterclockwise $\omega_1$, so that the second abutting end 923 releases the floating plate 1. The first elastic member 16 elastically retracts to a natural state and drives the floating plate 1 to move towards the fastening base 10, so that the rotating mechanism 100 rotates to a folded state.

When the rotating mechanism 100 is in the folded state, the floating plate 1 moves into the fastening base 10 and forms an avoidance space, to avoid the display screen 300 and prevent the floating plate 1 from squeezing the display screen 300 and damaging the display screen 300.

In this embodiment, the first pressing plate swing arm 91 is provided and the first pressing plate 41 drives the first pressing plate swing arm 91 to rotate, so that the first pressing plate 41 rotates relative to the fastening base 10, thereby improving the stability of the rotation of the first pressing plate 41. Moreover, in this embodiment, a plurality of first pressing plate swing arms 91 are provided, and the plurality of first pressing plate swing arms 91 jointly drive the first pressing plate 41 to rotate, so that the rotation stability of the first pressing plate 41 can be further improved. The second pressing plate swing arm 92 is provided and the second pressing plate 42 drives the second pressing plate swing arm 92 to rotate, so that the second pressing plate 42 rotates relative to the fastening base 10, thereby improving the stability of the rotation of the second pressing plate 42. Moreover, in this embodiment, a plurality of second pressing plate swing arms 92 are provided, and the plurality of second pressing plate swing arms 92 jointly drive the second pressing plate 42 to rotate, so that the rotation stability of the second pressing plate 42 can be further improved.

Figure 22:
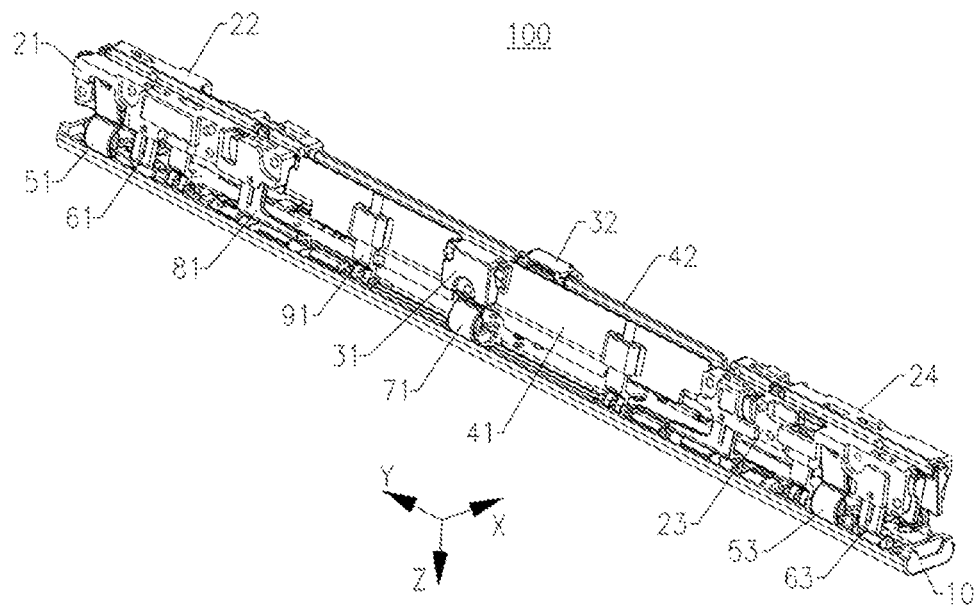
FIG. 22 is a schematic structural diagram of the rotating mechanism shown in FIG. 5 in a folded state.

Refer to FIG. 5 and FIG. 22. FIG. 22 is a schematic structural diagram of the rotating mechanism 100 shown in FIG. 5 in a folded state.

When the rotating mechanism 100 is in the unfolded state, the first fastening plate 21, the second fastening plate 22, the first auxiliary fastening plate 31, and the second auxiliary fastening plate 32 are all parallel to the direction X and are unfolded relative to the fastening base 10. Both the first pressing plate 41 and the second pressing plate 42 are parallel to the direction X and are unfolded relative to the fastening base 10. The first pressing plate 41, the second pressing plate 42, and the floating plate 1 jointly support the display screen 300.

When the first casing 210 rotates clockwise $\omega_2$, the first fastening plate 21 and the first auxiliary fastening plate 31 rotate clockwise $\omega_2$. When the first auxiliary fastening plate 31 rotates clockwise $\omega_2$, the first auxiliary swing arm 71 is driven to rotate clockwise $\omega_2$. When the first fastening plate 21 rotates clockwise $\omega_2$, the first main swing arm 51 and the first secondary swing arm 61 are driven to rotate clockwise $\omega_2$, and the first rotating body 511 slides in the first rotating slot 151 away from the fastening base 10. The first secondary swing arm 61 slides relative to the first fastening plate 21 while rotating clockwise $\omega_2$. At the same time, the rotation of the first fastening plate 21 also drives the first pressing plate 41 to rotate clockwise $\omega_2$, and causes the first pressing plate 41 to slide relative to the first fastening plate 21. When rotating clockwise $\omega_2$, the first pressing plate 41 drives the first pressing plate swing arm 91 to rotate clockwise $\omega_2$, so that the first pressing plate 41 rotates clockwise $\omega_2$ relative to the fastening base 10. Moreover, when the first fastening plate 21 rotates clockwise $\omega_2$, the first synchronous swing arm 81 of the synchronous component 80 is also driven to rotate clockwise $\omega_2$, and the first synchronous swing body 811 is caused to slide in the second slide slot 216, so that the first fastening plate 21 is unfolded relative to the fastening base 10.

When the first synchronous swing arm 81 rotates clockwise $\omega_2$, the first rotating sub-rod 831 drives the first rotating column 832 to rotate clockwise $\omega_2$, to drive the slider 85 to slide on the slide body 851 and cause the slider 85 to drive the second rotating column 842 to rotate counterclockwise $\omega_1$. When the second rotating column 842 rotates counterclockwise $\omega_1$, the second rotating sub-rod 841 is driven to rotate counterclockwise $\omega_1$, and the second synchronous swing arm 82 is driven to rotate counterclockwise $\omega_1$, thereby driving the second fastening plate 22 to rotate counterclockwise $\omega_1$.

When the second fastening plate 22 rotates counterclockwise $\omega_1$, the second main swing arm 52 and the second secondary swing arm 62 are driven to rotate counterclockwise $\omega_1$, and the second rotating body 521 slides in the second rotating slot 152 away from the fastening base 10. The second secondary swing arm 62 slides relative to the second fastening plate 22 while rotating counterclockwise $\omega_1$. At the same time, the second fastening plate 22 also drives the second pressing plate 42 to rotate counterclockwise $\omega_1$, and causes the second pressing plate 42 to slide relative to the second fastening plate 22, and when rotating counterclockwise $\omega_1$, the second pressing plate 42 drives the second pressing plate swing arm 92 to rotate counterclockwise $\omega_1$, so that the second pressing plate 42 rotates counterclockwise $\omega_1$ relative to the fastening base 10. When the second pressing plate 42 rotates counterclockwise $\omega_1$, the second auxiliary fastening plate 32 is also driven to rotate counterclockwise $\omega_1$, thereby driving the second auxiliary swing arm 72 to rotate counterclockwise $\omega_1$ relative to the fastening base 10, and then causing the rotating mechanism 100 to rotate to the folded state.

Figure 23:
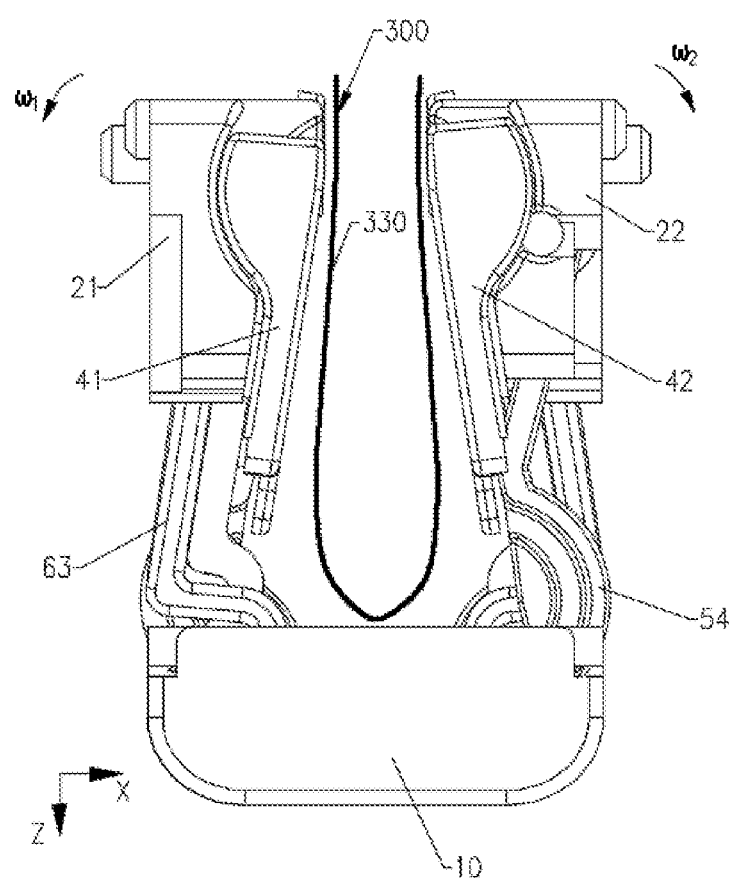
FIG. 23 is a schematic structural diagram of the foldable electronic device shown in FIG. 1 from another angle.

FIG. 23 is a schematic structural diagram of the foldable electronic device 500 shown in FIG. 1 from another angle.

When the foldable electronic device 500 is in the folded state, the foldable portion 330 of the display screen 300 is located on the inner side of the rotating mechanism 100. A part of the foldable portion 330 is located between the first pressing plate 41 and the second pressing plate 42 and is spaced apart from the first pressing plate 41 and the second pressing plate 42, and a part of the foldable portion 330 is opposite to the floating plate 1.

Still referring to FIG. 5 and FIG. 22, the first casing 210 rotates counterclockwise $\omega_1$, and the first fastening plate 21 and the first auxiliary fastening plate 31 rotate counterclockwise $\omega_1$. When the first auxiliary fastening plate 31 rotates counterclockwise $\omega_1$, the first auxiliary swing arm 71 is driven to rotate counterclockwise $\omega_1$. When the first fastening plate 21 rotates counterclockwise $\omega_1$, the first main swing arm 51 and the first secondary swing arm 61 are driven to rotate counterclockwise $\omega_1$, and the first rotating body 511 slides in the first rotating slot 151 towards the fastening base 10. The first secondary swing arm 61 slides relative to the first fastening plate 21 while rotating counterclockwise ox. At the same time, the rotation of the first fastening plate 21 also drives the first pressing plate 41 to rotate counterclockwise ox, and causes the first pressing plate 41 to slide relative to the first fastening plate 21. When rotating counterclockwise $\omega_1$, the first pressing plate 41 drives the first pressing plate swing arm 91 to rotate counterclockwise ox, so that the first pressing plate 41 rotates counterclockwise $\omega_1$ relative to the fastening base 10. Moreover, when the first fastening plate 21 rotates counterclockwise on, the first synchronous swing arm 81 is also driven to rotate counterclockwise on, and the first synchronous swing body 811 is caused to slide in the second slide slot 216, so that the first fastening plate 21 is folded relative to the fastening base 10.

When the first synchronous swing arm 81 rotates counterclockwise ox, the first rotating sub-rod 831 drives the first rotating column 832 to rotate counterclockwise ox, to drive the slider 85 to slide on the slide body 851 and cause the slider 85 to drive the second rotating column 842 to rotate clockwise $\omega_2$. When the second rotating column 842 rotates clockwise $\omega_2$, the second rotating sub-rod 841 is driven to rotate clockwise 62, and the second synchronous swing arm 82 is driven to rotate clockwise $\omega_2$, thereby driving the second fastening plate 22 to rotate clockwise $\omega_2$.

When the second fastening plate 22 rotates clockwise $\omega_2$, the second main swing arm 52 and the second secondary swing arm 62 are driven to rotate clockwise $\omega_2$, and the second rotating body 521 slides in the second rotating slot 152 towards the fastening base 10. The second secondary swing arm 62 slides relative to the second fastening plate 22 while rotating clockwise $\omega_2$. At the same time, the second fastening plate 22 also drives the second pressing plate 42 to rotate clockwise $\omega_2$, and causes the second pressing plate 42 to slide relative to the second fastening plate 22, and when rotating clockwise $\omega_2$, the second pressing plate 42 drives the second pressing plate swing arm 92 to rotate clockwise $\omega_2$, so that the second pressing plate 42 rotates clockwise $\omega_2$ relative to the fastening base 10. When the second pressing plate 42 rotates clockwise $\omega_2$, the second auxiliary fastening plate 32 is also driven to rotate clockwise $\omega_2$, thereby driving the second auxiliary swing arm 72 to rotate clockwise $\omega_2$ relative to the fastening base 10, and then causing the rotating mechanism 100 to return to the unfolded state.

In the rotating mechanism 100 provided in the present application, the slider 85 is provided between the first rotating rod 83 and the second rotating rod 84, and the first rotating rod 83 and the second rotating rod 84 are driven to synchronously rotate through the sliding of the slider 85, to drive the first synchronous swing arm 81 and the second synchronous swing arm 82 to synchronously rotate. The rotating mechanism 100 provided in this embodiment can implement synchronous rotation of the first synchronous swing arm 81 and the second synchronous swing arm 82 without synchronous gears, which can simplify the structure of the synchronous component 80, thereby reducing the thickness of the rotating mechanism 100 in the folded state and facilitating thinning of the foldable electronic device 500.

The above descriptions are only some embodiments and implementations of the present application, and the protection scope of the present application is not limited to this. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A rotating mechanism, comprising: a fastening base and a synchronous component; wherein the synchronous component comprises a first synchronous swing arm, a second synchronous swing arm, a first rotating rod, a second rotating rod, and a slider;

the first rotating rod and the second rotating rod are mounted side by side and in parallel to the fastening base, both the first rotating rod and the second rotating rod are rotatable relative to the fastening base, and the slider is located between the first rotating rod and the second rotating rod and is slidably connected to the first rotating rod and the second rotating rod;

the first synchronous swing arm and the second synchronous swing arm are respectively located on opposite sides of the fastening base, and the first synchronous swing arm is fixedly connected to the first rotating rod, and the second synchronous swing arm is fixedly connected to the second rotating rod;

the rotation of the first rotating rod pushes the slider to slide, to push the second rotating rod to rotate through the sliding of the slider, wherein a sliding direction of the slider is parallel to directions of axis centers of the first rotating rod and the second rotating rod, and rotation directions of the first rotating rod and the second rotating rod are opposite;

the synchronous component further comprises a fastening block and an elastic member, the fastening block is fixedly mounted on the fastening base, the elastic member is mounted in the fastening block, the fastening block comprises a first hinged body, and the first hinged body is rotatably mounted on the first rotating rod;

the first synchronous swing arm comprises a second hinged body, the first synchronous swing arm is fastened on the first rotating rod, the first hinged body and the second hinged body are hinged; and wherein when the first synchronous swing arm rotates, the first rotating rod is driven to rotate, and the first hinged body and the second hinged body repeatedly squeeze the elastic member, so that the elastic member is switched between an expanded state and a compressed state.

2. The rotating mechanism according to claim 1, wherein a first helical slot extends in the first rotating rod, a second helical slot extends in the second rotating rod, the first helical slot extends around an axial direction of the first rotating rod, the second helical slot extends around an axial direction of the second rotating rod, and the first helical slot is opposite to the second helical slot;

the slider comprises a sliding body, a first protrusion, and a second protrusion, and the first protrusion and the second protrusion respectively protrude on two opposite sides of the sliding body; the first protrusion is slidably mounted in the first helical slot, and the second protrusion is slidably mounted in the second helical slot; and the rotation of the first rotating rod drives the first protrusion to slide along the first helical slot, and drives the slider to slide, so as to push the second protrusion to slide along the second helical slot.

3. The rotating mechanism according to claim 2, wherein the first rotating rod comprises a first rotating sub-rod and a first rotating column, the first rotating column is fixedly connected to the first rotating sub-rod, a cross-sectional area of the first rotating column is larger than a cross-sectional area of the first rotating sub-rod, and the first helical slot extends in an outer peripheral surface of the first rotating column;

the second rotating rod comprises a second rotating sub-rod and a second rotating column, the second rotating column is fixedly connected to the second rotating sub-rod, a cross-sectional area of the second rotating column is larger than a cross-sectional area of the second rotating sub-rod, and the second helical slot extends in an outer peripheral surface of the second rotating column; and the first rotating column and the second rotating column are provided side by side, directions of axis centers of the first rotating column, the second rotating column, the first rotating sub-rod, and the second rotating sub-rod are all parallel, and the slider is located between the first rotating column and the second rotating column.

4. The rotating mechanism according to claim 3, wherein the first rotating sub-rod comprises a first flat shaft section, an outer peripheral surface of the first flat shaft section comprises a first flat surface section and a first cambered surface section, and the first flat surface section and the first cambered surface section are connected to each other;
  a first mounting hole extends in the first rotating column, and a contour of an inner wall of the first mounting hole is consistent with an outer contour of the first flat shaft section; and
  the first flat shaft section is at least partly mounted in the first mounting hole, and the rotation of the first rotating sub-rod drives the first rotating column to synchronously rotate.

5. The rotating mechanism according to claim 3, wherein the second rotating sub-rod comprises a second flat shaft section, an outer peripheral surface of the second flat shaft section comprises a second flat surface section and a second cambered surface section, and the second flat surface section and the second cambered surface section are connected to each other;
  a second mounting hole extends in the second rotating column, and a contour of an inner wall of the second mounting hole is consistent with an outer contour of the second flat shaft section; and
  the second flat shaft section is at least partly mounted in the second mounting hole, and the rotation of the second rotating sub-rod drives the second rotating column to synchronously rotate.

6. The rotating mechanism according to claim 4, wherein a first rotating hole extends in the first synchronous swing arm, a contour of an inner wall of the first rotating hole is consistent with an outer contour of the first flat shaft section, at least a part of the first flat shaft section is mounted in the first rotating hole, and the rotation of the first synchronous swing arm drives the first rotating rod to synchronously rotate.

7. The rotating mechanism according to claim 5, wherein a second rotating hole extends in the second synchronous swing arm, a contour of an inner wall of the second rotating hole is consistent with an outer contour of the second flat shaft section, at least a part of the second flat shaft section is mounted in the second rotating hole, and the rotation of the second synchronous swing arm drives the second rotating rod to synchronously rotate.

8. The rotating mechanism according to claim 1, wherein the fastening block is provided with a first shaft hole and a second shaft hole, the first shaft hole and the second shaft hole are arranged in parallel and at intervals, and the first shaft hole and the second shaft hole run through the fastening block in directions of axis centers of the first shaft hole and the second shaft hole; and the fastening block is fixedly connected to the fastening base, the first rotating rod is mounted in the first shaft hole, and the first rotating rod is rotatable in the first shaft hole, and the second rotating rod is mounted in the second shaft hole, and the second rotating rod is rotatable in the second shaft hole.

9. The rotating mechanism according to claim 1, wherein the synchronous component further comprises a first baffle and a second baffle, the first baffle and the second baffle are respectively located at two opposite ends of a moving direction of the slider, and are fixedly connected to the fastening base.

10. The rotating mechanism according to claim 1, wherein the rotating mechanism further comprises a first fastening plate and a second fastening plate, the first fastening plate is slidably connected to the first synchronous swing arm, and the second fastening plate is slidably connected to the second synchronous swing arm.

11. The rotating mechanism according to claim 10, wherein a first rotating slot and a second rotating slot extend in the fastening base, and the first rotating slot and the second rotating slot are provided opposite to each other;
  the rotating mechanism comprises a first main swing arm and a second main swing arm, the first main swing arm is mounted in the first rotating slot, and is slidable along the first rotating slot, and the first main swing arm is rotatably connected to the first fastening plate; and the second main swing arm is mounted on the second rotating slot and is slidable along the second rotating slot, and the second main swing arm is rotatably connected to the second fastening plate.

12. The rotating mechanism according to claim 10, wherein the rotating mechanism comprises a first secondary swing arm and a second secondary swing arm, and the first secondary swing arm is rotatably connected to the fastening base and is slidably connected to the first fastening plate; and the second secondary swing arm is rotatably connected to the fastening base and is slidably connected to the second fastening plate.

13. The rotating mechanism according to claim 1, wherein the rotating mechanism further comprises a first pressing plate and a second pressing plate, the first pressing plate is slidably connected to the first fastening plate, and when the first fastening plate rotates relative to the fastening base, the first pressing plate is driven to rotate relative to the fastening base; and the second pressing plate is slidably connected to the second fastening plate, and when the second fastening plate rotates relative to the fastening base, the second pressing plate is driven to rotate relative to the fastening base.

14. The rotating mechanism according to claim 13, wherein a first guide slot extends in the first fastening plate, the first pressing plate comprises a first guide slider, the first pressing plate is stacked with the first fastening plate, the first guide slider is located in the first guide slot, and the first guide slider is slidable along the first guide slot; and
  a third guide slot extends in the second fastening plate, the second pressing plate comprises a third guide slider, the second pressing plate is stacked with the second fastening plate, the third guiding slider is located in the third guide slot, and the third guide slider is slidable along the third guide slot.

15. The rotating mechanism according to claim 13, wherein the rotating mechanism further comprises a first pressing plate swing arm and a second pressing plate swing arm, an end of the first pressing plate swing arm is rotatably connected to the fastening base, and another end of the first pressing plate swing arm is slidably connected to the first pressing plate; and an end of the second pressing plate swing arm is rotatably connected to the fastening base, and another end of the second pressing plate swing arm is slidably connected to the second pressing plate.

16. The rotating mechanism according to claim 10, wherein the rotating mechanism comprises a first auxiliary fastening plate, a second auxiliary fastening plate, a first auxiliary swing arm, and a second auxiliary swing arm, the first auxiliary fastening plate and the first fastening plate are located on a same side of the fastening base, the first auxiliary fastening plate is spaced apart from the first fastening plate, and the first auxiliary swing arm is rotatably connected to the first auxiliary fastening plate and is rotatably connected to the fastening base; and the second auxiliary fastening plate and the second fastening plate are located on a same side of the fastening base, the second auxiliary fastening plate is spaced apart from the second fastening plate, and the second auxiliary swing arm is rotatably connected to the second auxiliary fastening plate and is rotatably connected to the fastening base.

17. A foldable electronic device, comprising a first casing, a second casing, a display screen, and a rotating mechanism, wherein the rotating mechanism is located between the first casing and the second casing, the display screen is mounted on the first casing, the second casing, and the rotating mechanism, and when the rotating mechanism rotates, the first casing and the second casing rotate relative to each other, to drive the display screen to fold or unfold, the rotating mechanism comprises a fastening base and a synchronous component; wherein the synchronous component comprises a first synchronous swing arm, a second synchronous swing arm, a first rotating rod, a second rotating rod, and a slider;

the first rotating rod and the second rotating rod are mounted side by side and in parallel to the fastening base, both the first rotating rod and the second rotating rod are rotatable relative to the fastening base, and the slider is located between the first rotating rod and the second rotating rod and is slidably connected to the first rotating rod and the second rotating rod;

the first synchronous swing arm and the second synchronous swing arm are respectively located on opposite sides of the fastening base, and the first synchronous swing arm is fixedly connected to the first rotating rod, and the second synchronous swing arm is fixedly connected to the second rotating rod; and the rotation of the first rotating rod pushes the slider to slide, to push the second rotating rod to rotate through the sliding of the slider, a sliding direction of the slider is parallel to directions of axis centers of the first rotating rod and the second rotating rod, and rotation directions of the first rotating rod and the second rotating rod are opposite;

the synchronous component further comprises a fastening block and an elastic member, the fastening block is fixedly mounted on the fastening base, the elastic member is mounted in the fastening block, the fastening block comprises a first hinged body, and the first hinged body is rotatably mounted on the first rotating rod;

the first synchronous swing arm comprises a second hinged body, the first synchronous swing arm is fastened on the first rotating rod, the first hinged body and the second hinged body are hinged; and wherein when the first synchronous swing arm rotates, the first rotating rod is driven to rotate, and the first hinged body and the second hinged body repeatedly squeeze the elastic member, so that the elastic member is switched between an expanded state and a compressed state.

18. The foldable electronic device according to claim 17, wherein a first helical slot extends in the first rotating rod, a second helical slot extends in the second rotating rod, the first helical slot extends around an axial direction of the first rotating rod, the second helical slot extends around an axial direction of the second rotating rod, and the first helical slot is opposite to the second helical slot;

the slider comprises a sliding body, a first protrusion, and a second protrusion, and the first protrusion and the second protrusion respectively protrude on two opposite sides of the sliding body; the first protrusion is slidably mounted in the first helical slot, and the second protrusion is slidably mounted in the second helical slot; and the rotation of the first rotating rod drives the first protrusion to slide along the first helical slot, and drives the slider to slide, so as to push the second protrusion to slide along the second helical slot.

19. The foldable electronic device according to claim 18, wherein the first rotating rod comprises a first rotating sub-rod and a first rotating column, the first rotating column is fixedly connected to the first rotating sub-rod, a cross-sectional area of the first rotating column is larger than a cross-sectional area of the first rotating sub-rod, and the first helical slot extends in an outer peripheral surface of the first rotating column;

the second rotating rod comprises a second rotating sub-rod and a second rotating column, the second rotating column is fixedly connected to the second rotating sub-rod, a cross-sectional area of the second rotating column is larger than a cross-sectional area of the second rotating sub-rod, and the second helical slot extends in an outer peripheral surface of the second rotating column; and the first rotating column and the second rotating column are provided side by side, directions of axis centers of the first rotating column, the second rotating column, the first rotating sub-rod, and the second rotating sub-rod are all parallel, and the slider is located between the first rotating column and the second rotating column.

20. The foldable electronic device according to claim 19, wherein the first rotating sub-rod comprises a first flat shaft section, an outer peripheral surface of the first flat shaft section comprises a first flat surface section and a first cambered surface section, and the first flat surface section and the first cambered surface section are connected to each other;

a first mounting hole extends in the first rotating column, and a contour of an inner wall of the first mounting hole is consistent with an outer contour of the first flat shaft section; and the first flat shaft section is at least partly mounted in the first mounting hole, and the rotation of the first rotating sub-rod drives the first rotating column to synchronously rotate.

* * * * *